United States Patent [19]

Marks

[11] Patent Number: 4,523,112
[45] Date of Patent: Jun. 11, 1985

[54] ELECTROTHERMODYNAMIC (ETD) POWER CONVERTER WITH CONICAL JET

[76] Inventor: Alvin M. Marks, Bigelow Rd., Athol, Mass. 01331

[21] Appl. No.: 479,986

[22] Filed: May 29, 1983

Related U.S. Application Data

[63] Continuation-in-part of Ser. No. 237,290, Feb. 23, 1981, Pat. No. 4,395,648.

[51] Int. Cl.³ .............................................. H02N 1/00
[52] U.S. Cl. ........................................ 310/10; 310/11
[58] Field of Search ................. 310/300, 308, 309, 10, 310/11

[56] References Cited

U.S. PATENT DOCUMENTS

| | | | |
|---|---|---|---|
| 3,456,135 | 7/1969 | Marks | 310/10 |
| 3,723,777 | 3/1973 | Musgrove | 310/10 X |
| 3,792,293 | 2/1974 | Marks | 310/11 X |
| 3,853,580 | 12/1974 | Gourdine | 310/309 X |
| 4,395,648 | 7/1983 | Marks | 310/11 X |

Primary Examiner—Donovan F. Duggan

[57] ABSTRACT

These inventions relate to novel advances in Electrothermodynamics (ETD), also known as charged aerosol, heat/electric power generators:

(1) "Method III" two-fluid mixed flow comprising a supersonic jet expanding conically within a subsonic flow, separated by a boundary layer in which the charged aerosol forms downstream of the orifice, at a cross section of at least 100 times the orifice section; and in which the electric charge density of the charged aerosol decreases along the jet axis, whereby substantially all of the kinetic power of the jet is converted to electric power within the jet, there being no ejector.

(2) An array of supersonic jets utilizing Method III.

(3) An array of supersonic jets utilizing Method III without separating duct walls in which "convection cells" provide return flows, forming a plurality of TORON configurations.

(4) A supercritical Rankine cycle in a single stage employing Method III.

8 Claims, 31 Drawing Figures

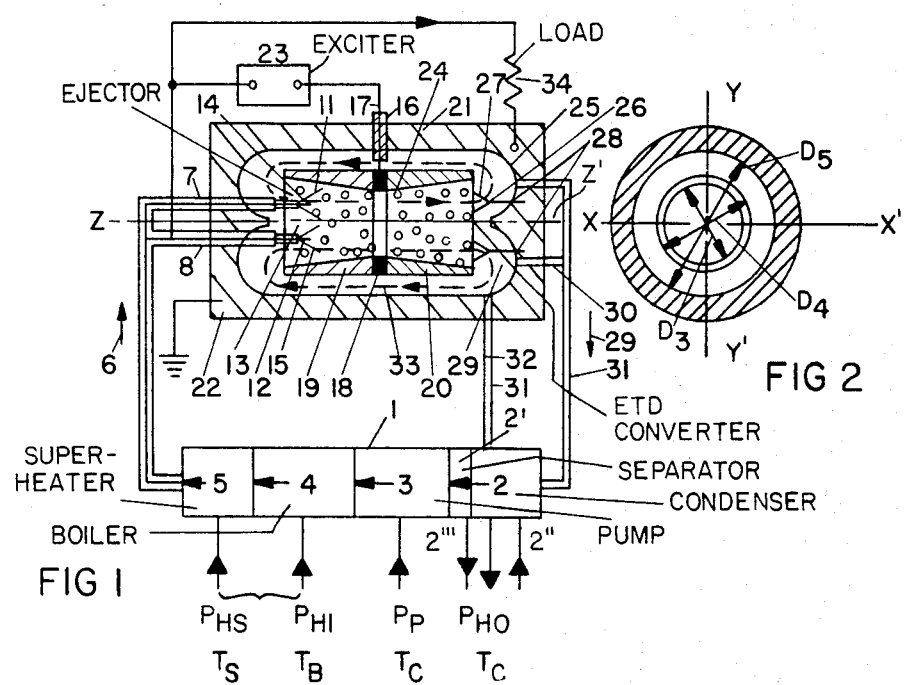
FIG 1
FIG 2
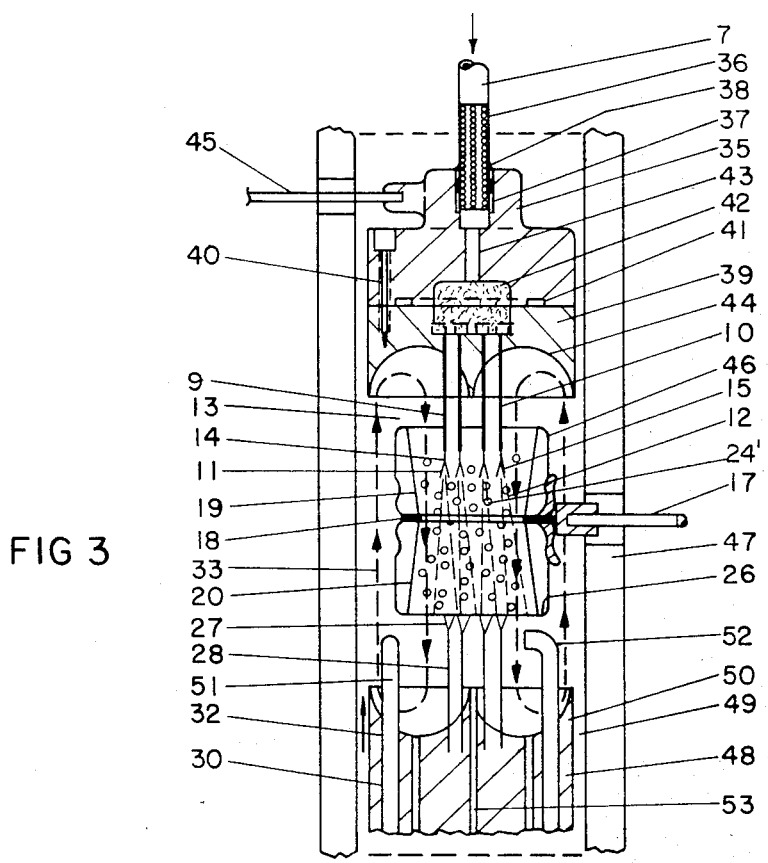
FIG 3

DIAGRAM OF TORON CIRCULATION WITH METHOD II

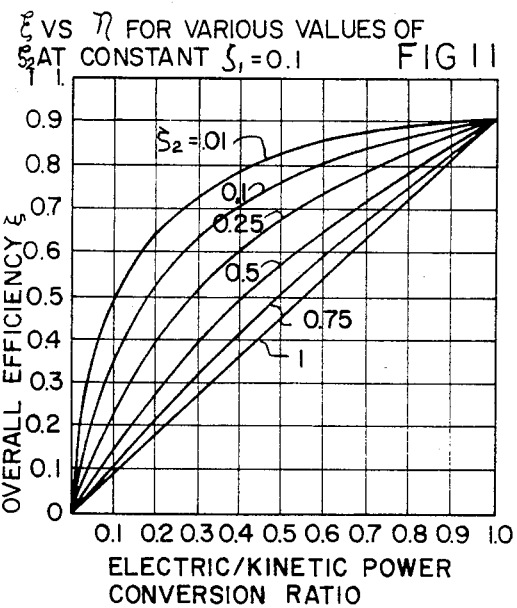
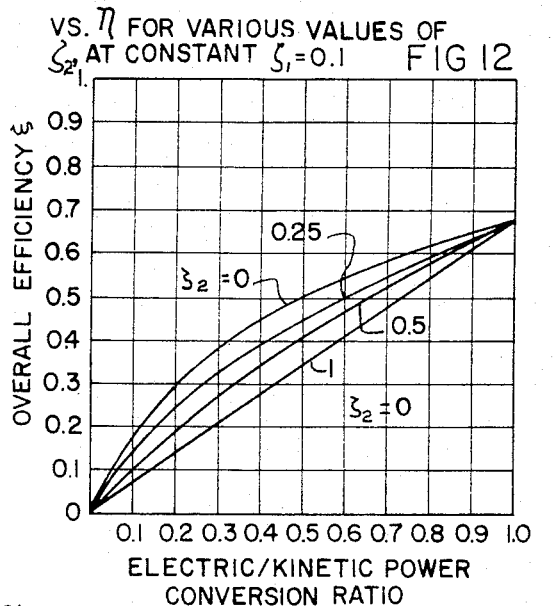
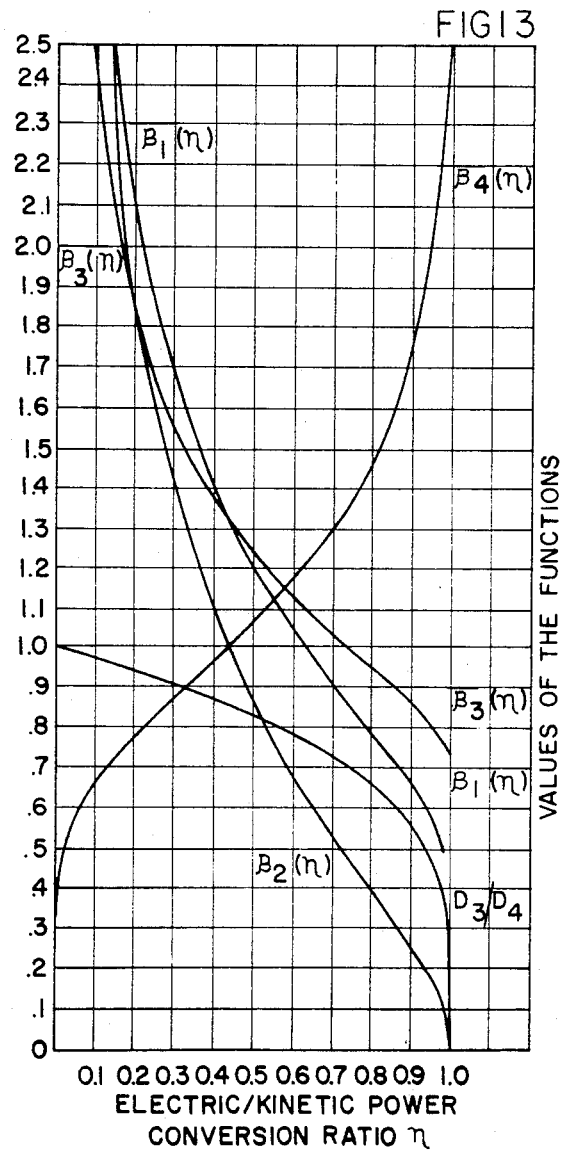
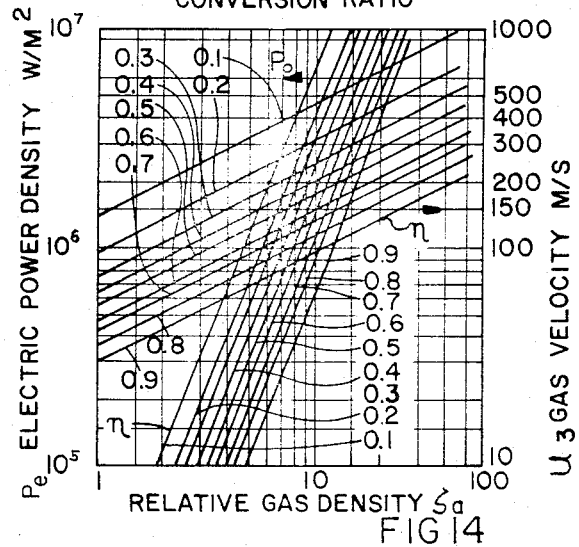
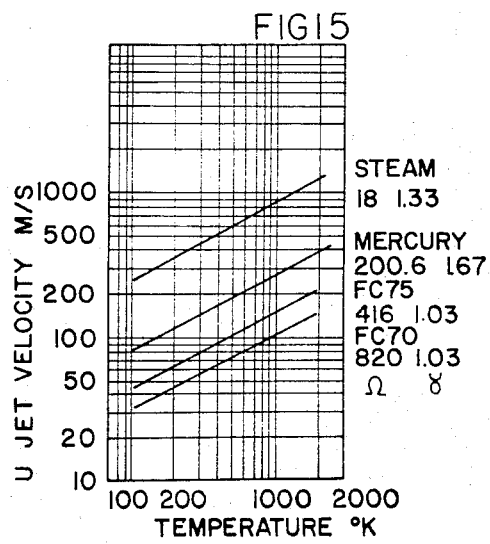

KINETIC/ELECTRIC POWER CONVERSION
METHOD III

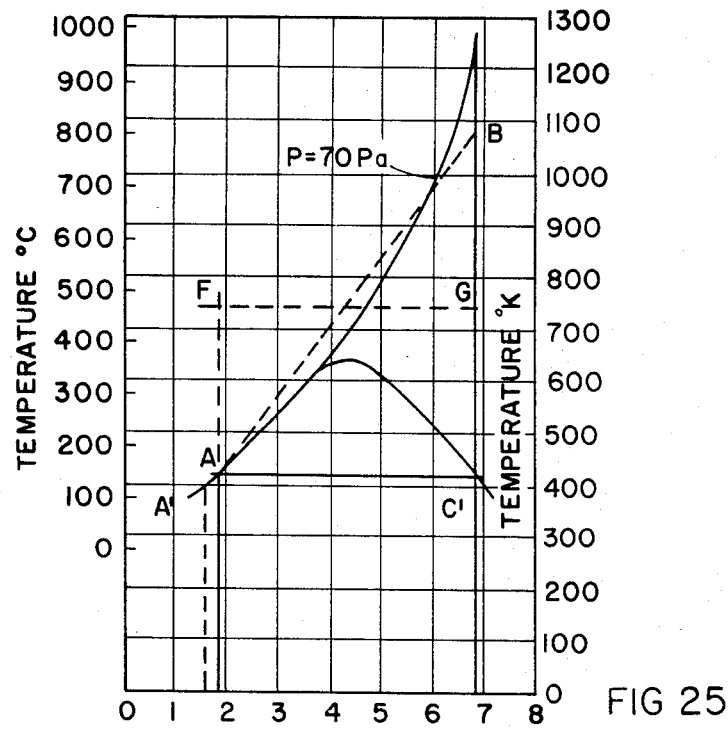
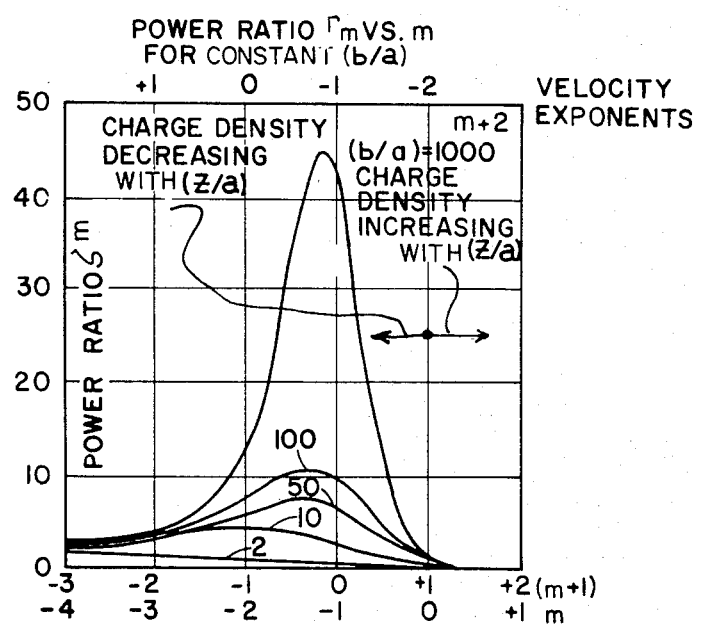
FIG 24
FIG 25

ELECTROTHERMODYNAMIC (ETD) POWER CONVERTER WITH CONICAL JET

This is a continuation-in-part of Ser. No. 06/237,290, filed 2/23/81, entitled "Electrothermodynamic (ETD) Power Converter" now U.S. Pat. No. 4,395,648, 7/26/83.

In the present invention a charged aerosol of decreasing charge gradient is employed with new, unusual and advantageous results, as explained hereinafter.

DEFINITIONS

Total Efficiency—The efficiency of the entire device including the thermal cycle and the ETD Generator.

Thermal Efficiency—The efficiency of the thermal cycle only.

Overall Efficiency—The efficiency of the ETD generator only, which includes the ejector section.

Ejector Efficiency—The efficiency of the ejector section only.

Electric Conversion Efficiency—The efficiency of the ETD Converter section only.

Electrothermodynamic (ETD)

Electrothermodynamic (ETD) is a term applied to devices for the conversion of thermal and/or kinetic power to electric power through the medium of a charged aerosol, comprising electrical charged liquid droplets in a vapor and/or gas. This charged aerosol is a new reversible medium combining the thermal/mechanical gas laws with electrodynamics, linking thermal, mechanical and electrical power reversibly and interchangeably. The charged liquid droplets are sources or sinks of heat energy. By controlling the ratio of the mass of the charged liquid droplets to the gas/vapor in which they are suspended, an isothermal or adiabatic expansion or compression may be produced.

TORON

A torus of revolution, such as shown in FIG. 1, which has the Z Z' axis as the axis of revolution.

Single Fluid Method I

In Method I, a single fluid comprises a gas/vapor charged aerosol moving with a large velocity at constant charge density in a duct, and a proportion of the kinetic power is converted to electric power.

Mixed Flow Method II

In Method II an ejector is used, in which a jet mixes with the fill gas and transfers the jet kinetic power to a charged aerosol gas-vapor of larger area at a smaller velocity, whereupon it is converted to electric power. It is preferred that the jet vapor has a high molecular weight; for example, 200–800, so that the jet velocity can be approximately that of the fill gas, for efficient energy transfer.

Separated Flow Method III

In Method III, a supersonic jet issues in an expanding cone from a small orifice. The charged aerosol is formed on ions at a plane having an area of about $10^3$ times the orifice area. Beyond this plane the charged aerosol continues to expand at decreasing velocity. The supersonic jet is separated by a conical boundary layer from the surrounding subsonic gas. The charge density of the charged aerosol decreases, which enables an efficient direct ETD conversion of the kinetic power to electric power of a gas-vapor charged aerosol within the diverging cone of the supersonic jet, as hereinafter described.

Two Fluid Charged Aerosol, Internal Heat Source Method IV

In Method IV conductive liquid (metal, water) is heated to a high temperature and introduced as a charged aerosol produced by electric induction, the liquid issuing from a small diameter orifice into an inert gas. The charged droplets, which are at a high temperature, heat the gas and cause it to expand almost isothermally, thereby transferring heat-kinetic power directly to electric power. This principle may be applied to an Ericsson ETD Cycle which operates at high temperature differentials and has an inherently large thermal efficiency. In this cycle a cross flow heat exchanger is employed with the circulating gas between an ETD generator and an ETD compressor.

Two Fluid Charged Aerosol/Internal Heat Source Method V

This method is generally similar to Method IV, but utilizes instead a Carnot ETD cycle. This method and power conversion devices operating in accordance therewith are described in my earlier U.S. Pat. No. 3,297,887[14].

It is an object of this invention to provide an improved heat/electric electrothermodynamic (ETD) generator.

It is another object of this invention to provide a novel improved gas flywheel geometry herein termed the TORON.

It is another object of this invention to provide an improved ejector for a kinetic/electric ETD power converter.

It is another object of this invention to provide, in an embodiment known as Method II, an ejector of improved efficiency, using a high molecular weight vapor (MW=18 to 1000) jet having a velocity slightly exceeding the velocity of a low molecular weight carrier gas or vapor.

It is a further object of this invention to provide, in an embodiment known as Method II, a high molecular weight high electric breakdown strength vapor comprising a fluorocarbon having a molecular weight from 100 to 1000 as a carrier gas.

It is another object of this invention to provide a carrier gas of low molecular weight, and increased electric breakdown strength.

Another object of this invention is to provide a novel method of manufacturing an insulated leadin tube for high pressure superheated steam, comprising a sapphire tube specially sealed to a stainless steel pipe fitting.

It is another object of this invention using Method III to increase electric power and current and decrease the voltage during the direct conversion of kinetic power to electric power in a supersonic jet.

It is another object of this invention to provide a supercritical Rankine cycle of increased thermal efficiency, using a Method designated as III, in which a supersonic jet directly converts most of its kinetic power to electric power.

A further object of this invention is to provide, in an embodiment known as Method IV, a high total efficiency heat/electric ETD generator in a Marks-Ericsson type cycle.

BACKGROUND OF THE INVENTION

Efficient charged aerosol generators may be fabricated in sizes from about 1 kilowatt up to the multi-megawatt range, covering the entire gamut of sizes required for various power requirements. Advantages of the charged aerosol electrothermodynamic devices are:

(a) High power density 0.1 to 50 megawatts/$m^2$
(b) High power concentration 1 to 1000 megawatts/$m^3$
(c) High power to mass ratio $10^3$ to $10^5$ watts/kg
(d) A static device containing no moving parts except moving gases and liquids.
(e) Low investment cost and maintenance costs per unit of power output
(f) High reliability
(g) Silent operation
(h) Operation with conventional materials at temperatures up to 2500° K.
(i) Efficiencies up to 60 to 70%

Extensive background work is described which gave rise to an understanding of the problems to which the present inventions provide the solutions needed to construct practical and useful ETD generators.

A. From 1842 to 1932

In 1842–44 Armstrong[1] described his work with a primitive electrohydrodynamic steam generator. Large condensed droplets were charged by "friction." A steam jet carried these charged water particles in air toward a collector electrode. Sparks were produced having a potential of several million volts at very small current. It is curious that the significance of this important work was not appreciated until more than 100 years had passed.

In the meantime, development proceeded along the indirect route of the heat-mechanical-magneto-electric principles, which culminated in the heat-turbo-magneto-electric generators used in present day heat-electric power plants.

The current work on the MHD generator follows the same route utilizing heat-dynamic-magneto-electric principles, but replacing the mechanical link with a moving gas as the dynamic link.

The direct route to conversion of heat to electric power by the heat-dynamic-electric principle, which eliminates both the mechanical and magnetic links, but using a moving gas as the dynamic link, had to await further advances in science and technology. The heat-dynamic-electric effect is termed herein the ETD, or the Electrothermodynamic effect. The ETD effect had to be further elucidated before the attainment of practical application to heat-electric power generation.

In 1890, Von Helmholtz and Richarz[2] described the condensation of steam in the presence of ions.

In 1914, Zeleney[3] described the production of charged aerosol droplets from liquid surfaces exposed to a strong electrical field.

In 1924, Millikan[4] established the elementary charge of the electron by observing with a microscope the motion of individual droplets in opposing gravitational and electrical fields, as these droplets acquired one or more electron charges. He reported an equation for the mobility of the charged particles as a function of charge and radius. Using this equation, Marks was subsequently able to predict the size and charge of particles having negligible mobility, for use in a charged aerosol generator.[7,2]

In 1932, Pauthenier and Moreau-Hanot[5] studied the charging of small metallic and dielectric spheres in electrical field. In the same year Vollrath[6] utilized the frictional charging of silica dust in electric generator to produce an output of 260 kilovolts at 80 microamperes (20.8 watts with a cross section of 1.53 $cm^2$, or 13.6 watts/$cm^2$). Solid dusts, however, do not appear suitable for practical electrothermodynamic devices. Electrodes are caked and eroded; circulation, charging and discharging problems are severe. Nevertheless, the art again ignored this important lead.

B. From 1932 to 1959

Starting about 1932, Marks investigated the problem of conversion of heat power to electrical power experimentally and theoretically.

A solution to the problem was found by the use of a charged aerosol which provided submicron charged liquid particles of negligible mobility in a device employing electric fields only.

Following these investigations, U.S. Pat. No. 2,638,555 was granted in 1953[7]. Other patents subsequently were issued as the work progressed, U.S. Pat. No. 2,638,555, which includes a mathematical-physics analysis of charged aerosol generator operating in the frictionless constant thermodynamic state, disclosed that:

(a) The electrical output is limited by spark breakdown of the gas. However, the electrical intensity at breakdown can be increased by increasing the gas pressure, and utilizing suitable gases and spark inhibitors.
(b) The charged aerosol creates a space charge, with the electrical potential increasing parabolically with distance, and reaching a maximum at a critical conversion space length.
(c) The conversion space length is inversely proportional to charge density.
(d) Lower voltages and higher current densities are obtained with shorter conversion lengths, which are of the order of millimeters.

All of these analytical results have been experimentally verified. Marks showed in U.S. Pat. No. 3,417,267 that the motion of the charged aerosol could be created by the expansion of a gas from a liquid in a boiler (Rankine cycle)[8].

C. From 1959 to 1962

Marks started work on the aerosol generator project under the sponsorship of the Bureau of Naval Weapons, U.S. Navy Department in June, 1959[9].

An initial problem was to efficiently form and charge a liquid aerosol instantaneously.

Attempts to utilize a preformed liquid aerosol and subsequently charge it resulted in these difficulties:

(a) Aerosols of high particle concentration of the order of $10^{16}$ particles per $m^3$ were readily formed but almost immediately coagulated and condensed upon walls and pipes.
(b) The lower concentration aerosol which we attempted to charge, required excessive ionizing power which was of the order of 40 times the output power.

Thus, low electrical power output and high electrical power inputs were obtained, which was most discouraging.

However, in the course of this work, two new means of simultaneously forming and charging a liquid aerosol with high efficiency were developed:

(a) The electrojet principle, shown in U.S. Pat. No. 3,191,077[10].

(b) The condensation principle shown in U.S. Pat. No. 3,411,025[11].

In the electrojet method, a thin stream of liquid such as water is forced under pressure through a small hollow needle and subjected to both the motion of the gas and an intense electrical field. The particles then break up into a highly concentrated charged aerosol. The input electric power to the aerosol charging and formation device is entirely negligible compared to the output electric power of the generator.

In the condensation method, a charged aerosol is formed as follows: A small diameter tungsten wire, of the order of 1 mil diameter, is exposed to an intense electrical field. The incoming gas contains a vapor which has been supercooled by sudden expansion of the gas as it passes through the throat of the nozzle. The gas condenses out on the individual ions producing a highly concentrated charged aerosol. Again the expenditure of input electrical power is entirely negligible compared to the output electrical power. The currents are surprisingly high, being of the order of 150 microamps from a single wire at a pressure of about 4 atmospheres. The current output increases linearly with the pressure up to about 30 atmospheres.

After having solved the problem of the simultaneous formation and charging of a liquid aerosol by the above two methods, the charged aerosol electrothermodynamic effect was demonstrated and measured. This required instrumentation which brought together the techniques of measuring the input and output aerodynamic and electric variables for simultaneous comparison. Static and total pressure probes and thermometers are provided to take aerodynamic measurements at various stations. Input and output electrical measurements were taken simultaneously.

The most dramatic result of this work was the visual observation of changes in differential pressure across the total pressure probes as the output electric power was varied. This differential pressure at the known velocity of the gas showed a high efficiency of direct conversion into electrical power of the heat and/or kinetic power of the gas stream. Neglecting wall frictional losses, the peak conversion efficiency (electric power output/change in differential pressure times volume flow) observed in tests was 83%.

Thus, the conversion of heat and/or kinetic power to electric power through the medium of a charged aerosol has been observed. A study of the mobility of particles having various numbers of charges and different radii was made. The various known methods of charging an aerosol were considered to establish parameters.

Both the electrojet process and condensation process efficiently provide charged aerosol particles of negligible mobility and high concentration. The analysis originally presented by Marks in U.S. Pat. No. 2,638,555[7] was experimentally verified and the results are shown in U.S. Pat. No. 3,417,267[8], FIGS. 8, 9, and 10.

The voltage was found to rise linearly with the gas density, or pressure at constant temperature. The current was also found to rise linearly with the gas density, or the square of pressure at constant temperature. We also found that the critical length of the conversion space was related to charge density and the maximum electric voltage was originally predicted by the derived equations. The analysis was thus experimentally verified.

In U.S. Pat. No. 3,417,267, Table I, Column 10[8] there is shown the operating characteristics reported by Marks for an open cycle test operating according to Method I, which showed that only about 1% of the kinetic power of the jet could be converted to electrical power.

Concept A is defined as the conversion of the kinetic power of a gas to electric power, with no change in thermodynamic state. This is the concept most widely used, and first described in U.S. Pat. No. 2,638,555[7].

Concept B is defined as the conversion of a part of the internal heat power of a charged aerosol gas to electric power, with no change in kinetic power; that is, at constant velocity, but with a drop in temperature.

In 1963 Marks achieved operation of a charged aerosol converter in a Rankine cycle at temperatures between 500° K. and 630° K.[9,4] A single component charged aerosol was produced from superheated steam having a singly charged particle with a radius of about 10 Å.

Experimentally, a power density of 120 kW/m$^2$ was obtained under conditions ($P_{in} \approx 10$ atmos, $T_{in} = 488°$ K.) for which calculations predict 560 kW/m$^2$ for single charged particles with a radius greater than 50 Å.

The gas flywheel concept was invented in which the input kinetic power is substantially matched to the electric power output, on which U.S. Pat. No. 3,456,135 is based[12].

A charged aerosol is a cloud of electrically charged liquid droplets suspended in a gas. By ETD (electrothermodynamic) is meant a charged aerosol heat/electric power generator, which is the simplest and most efficient means of small and large-scale power generation and conservation.

The National Bureau of Standards conducted a comprehensive review in[13] 1978. They reached the following conclusions and recommendations:

(1) Marks was well ahead of the state of the art of electrothermodynamics
(2) Previous funding was stated to be inadequate
(3) The Department of Energy should immediately fund a 10 kW generator.

As a result of this recommendation, various contracts were entered into 10 between Marks Polarized Corporation and the Department of Energy[27], which led to certain of the inventions disclosed herein.

BACKGROUND OF THE INVENTION

The present inventions resulted from earlier work by the Applicant, commencing in 1945.

U.S. Pat. No. 2,638,555, issued May 12, 1953, entitled "Heat-Electric Power Conversion Through the Medium of a Charged Aerosol"[7], established the basic principles of Electrothermodynamics (ETD), in particular, the mathematical physics, showing the relationship between the physical variables and various structures operating according to Method I. The charged aerosol was formed by ionic attachment to preformed charged aerosols. The kinetic/electric energy conversion took place without subsequent recovery of the kinetic power remaining in the gas stream.

In U.S. Pat. No. 3,191,077, issued June 22, 1965, entitled "Power Conversion Device"[10], inventors Alvin M. Marks and Ernesto Barreto disclosed an "electrojet" method of charging droplets by electric induction, which is a very efficient method of producing a charged aerosol.

U.S. Pat. No. 3,297,887, issued Jan. 10, 1967, entitled "Heat Electrical Power Transducer"[14], discloses the use of charged aerosols operating as an electrothermodynamic medium in a Carnot cycle. The charged aerosol comprises liquid metal charged aerosols formed by the electrojet method. The liquid/gas ratio of the charged aerosol is controlled to determine kinetic/electric power conversion in the isothermal or adiabatic modes. The liquid droplets are utilized as an internal heat source in the isothermal electric generator stage and as an internal heat sink in the isothermal compressor stage. No external heat exchangers are used, except to heat the liquid metal and to cool the liquid water. The ETD Carnot cycle makes possible a high temperature (1800° K. to 2400° K.) heat input, and a low ambient temperature for the heat sink output 300° K., thus enabling efficient (70%) heat/electric power conversion. The mathematical physics and thermodynamics of this system are given. This system is a precursor of Method IV which is a new, improved, simplified Elctrothermodynamic Ericsson cycle utilizing new working materials, for example tin/water, which are not previously disclosed in this cited prior art patent.

U.S. Pat. No. 3,411,025, issued Nov. 12, 1968, entitled "Method and Apparatus for Producing Charged Aerosols"[11] defines an optimum charged aerosol and describes various methods of production. The Condensation Method for producing a charged aerosol is described.

U.S. Pat. No. 3,417,267, issued Dec. 17, 1968, entitled "Heat-Electrical Power Interconversion Devices"[8] further discloses the formation of a charged aerosol by the Condensation Method. Experimental data and theoretical calculations are compared with good agreement and devices described.

U.S. Pat. No. 3,456,135, issued July 15, 1969, entitled "Gas Flywheel Power Converter"[12], discloses the major invention of a gas flywheel. In the kinetic/electric power conversion utilizing a charged aerosol, a fraction of the kinetic power remains after the conversion process. The gas flywheel enables this kinetic power to be circulated and used again as the gas returns to the conversion section. Method II is based upon this invention. The disclosure in the present application contains various improved ranges of operating variables required for the efficient operation of the gas flywheel using a TORON configuration instead of the torus disclosed in this prior art invention and other advances, as described hereinafter. A problem with the prior art device is the efficient coupling of the kinetic power of the vapor jet with that of the carrier gas. The prior art discloses that the velocity of the vapor jet should be only slightly greater than that of the circulating stream, and that the circulating gas stream should be at a low velocity (100–300 m/s). In practice because of its low molecular weight (18), a stream vapor jet has too high a velocity (500–1500 m/s). A prior art reference[15] disclosed the use of a high molecular weight (200) vapor comprising mercury issuing from a high temperature source into a low temperature hydrogen carrier gas. The use of hydrogen as a carrier gas and an electronegative gas, such as Freon, for use as electron-absorbers to increase the electric breakdown strength of the gas, are disclosed in my prior art patents; for example, U.S. Pat. No. 2,638,555[7]. Because of its toxicity, mercury vapor is impractical for most applications and particularly for home use.

U.S. Pat. No. 3,518,461, issued June 30, 1970, entitled "Charged Aerosol Power Conversion Device and Method"[16] discloses various processes and devices for producing charged droplets having an optimum ratio of radius to charge. Optimum operating conditions are also described.

U.S. Pat. No. 3,792,293, issued Feb. 12, 1974, entitled "Electrostatic Generator with Charging and Collecting Arrays"[17] describes an electrothermodynamic converter utilizing a sheet conversion space containing many emitters in an array and a smaller number of exciter electrodes surrounding each of the emitter arrays. This concept is utilized particularly in connection with Method II described herein.

U.S. Pat. No. 4,206,396, issued June 3, 1980, entitled "Charged Aerosol Generator with Uni-Electrode Source"[18] describes various methods of producing charged aerosols (see Table I, column 6). In particular, there is disclosed a Uni-Electrode circuit which is particularly useful because the collector elements are maintained at ground potential whereas the emitter elements are isolated at the high potential. In this way, the body of the device is entirely at ground potential and all of the charges are collected at ground potential so that none are lost. This invention is utilized in the generator designs disclosed in the present application.

The applicant's background inventions have been utilized and incorporated in one or more of the designs disclosed herein in combination with new inventions to obtain new, unusual and unexpected advances in the art of electrothermodynamic heat/electric power generation, which will become apparent from the disclosures presented hereinafter.

FIGURES

FIG. 1 shows cross section of a TORON ETD Charged Aerosol Heat/Electric Generator and block diagram of thermal cycle components.

FIG. 2 is a cross section of the device of FIG. 1 along the YX plane.

FIG. 3 is a cross sectional detail of a TORON ETD Generator.

FIG. 11 shows overall efficiency $\xi$ vs. electric/kinetic conversion ratio $\eta$ for $\zeta_1 = 0.1$ for values of $\zeta_2$ from 0 to 1.

FIG. 12 shows overall efficiency $\xi$ vs. electric/kinetic conversion ratio $\eta$ for $\zeta_1=0.5$ for values of $\zeta_2$ from 0 to 1.

FIG. 13 shows values of $\beta_1(\eta)$, $\beta_2(\eta)$, $\beta_3(\eta)$, $\beta_4(\eta)$ and $D_3/D_4$ vs. $\eta$.

FIG. 14 shows electric power density $P_e$ in W/m² and gas velocity U in m/s vs. relative gas density $\delta_a$ for various values of kinetic/electric conversion ratio $\eta$.

FIG. 15 shows sonic velocity vs. temperature in °K. for steam, mercury, and fluorocarbons FC-75 and FC-70.

FIG. 22 shows voltage ratio $\chi_m$ vs. exponent m for various constant values of b/a.

FIG. 23 shows maximum current ratio $\zeta_m^{-1}$ vs. exponent m for various constant values of b/a.

FIG. 24 shows the power ratio $\zeta_m$ vs. exponent m for various constant values of b/a.

FIG. 25 shows a temperature-entropy cycle diagram of a supercritical single stage steam cycle of an ETD generator according to Method III.

THE ETD GENERATOR

A "Z" TORON, shown diagrammatically in FIG. 1 and in a cross sectional view in FIG. 2, may be employed as a "gas flywheel",[12] as described in my U.S. Pat. No. 3,456,135.

Except for the ejector-converter sections, its cross section is maintained constant; ther is no diffuser, and hence no diffuser loss. It may be operated at an electric conversion efficiency near 80%; the exit kinetic power from the conversion section and the circulating kinetic power loss is then small.

Figure 4:
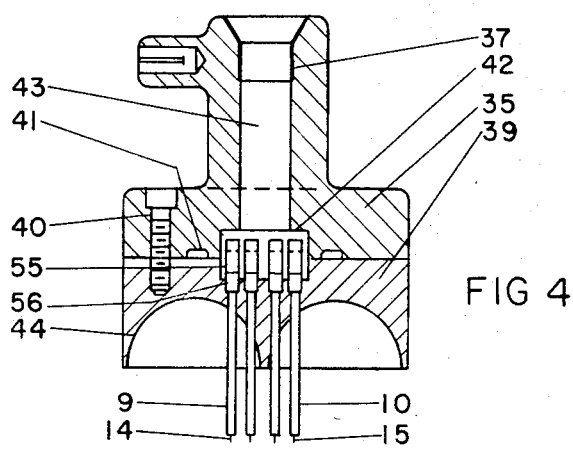
FIG. 4 is a top sectional view of emitter elements with multiple jet orifices.
Figure 5:
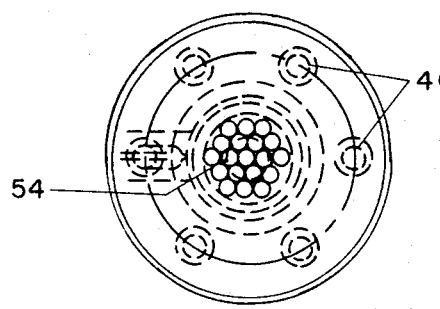
FIG. 5 is a bottom view of emitter elements.
Figure 6:
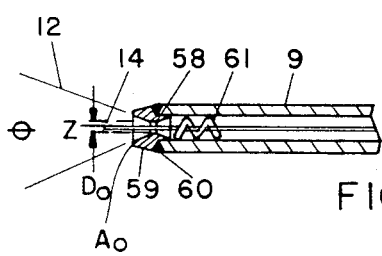
FIG. 6 shows a magnified sectional view of an orifice emitter element along its Z Z' axis.
Figure 7:
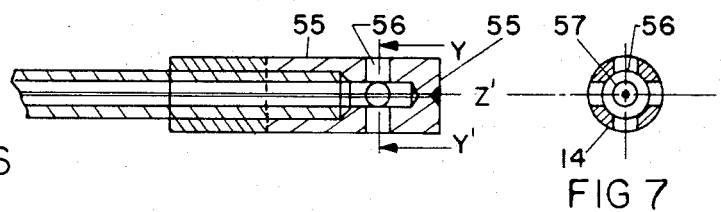
FIG. 7 is a magnified sectional view of an orifice emitter element cut along the Y Y' plane.
Figure 10:
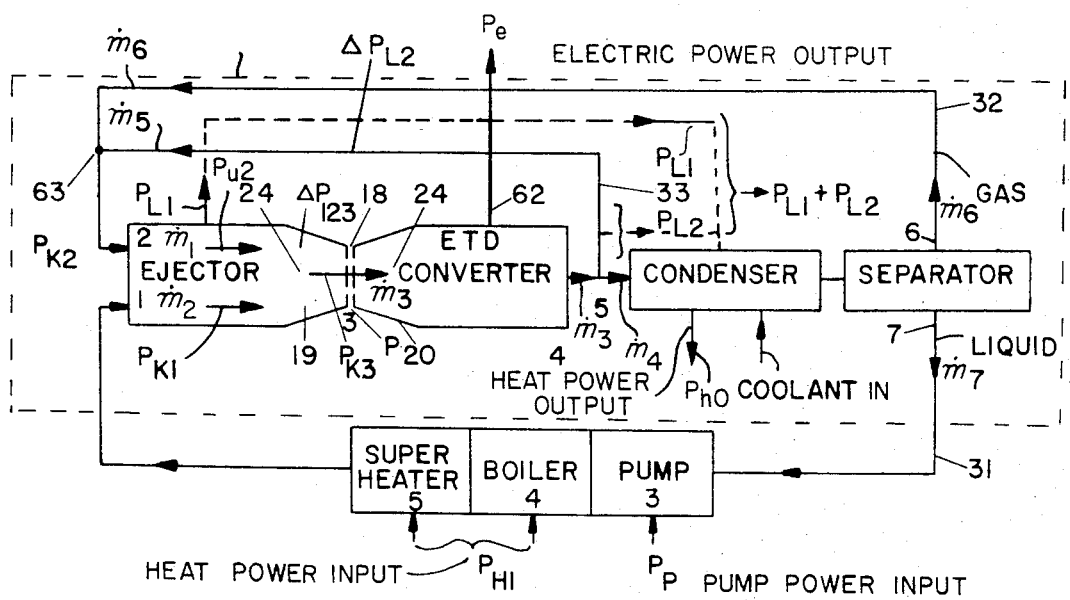
FIG. 10 is a block diagram of a single stage gas flywheel ETD Generator using Mixed Flow Method II, showing gas/vapor liquid mass flow circulation, and thermal and electrical power inputs and outputs.
Figure 8:
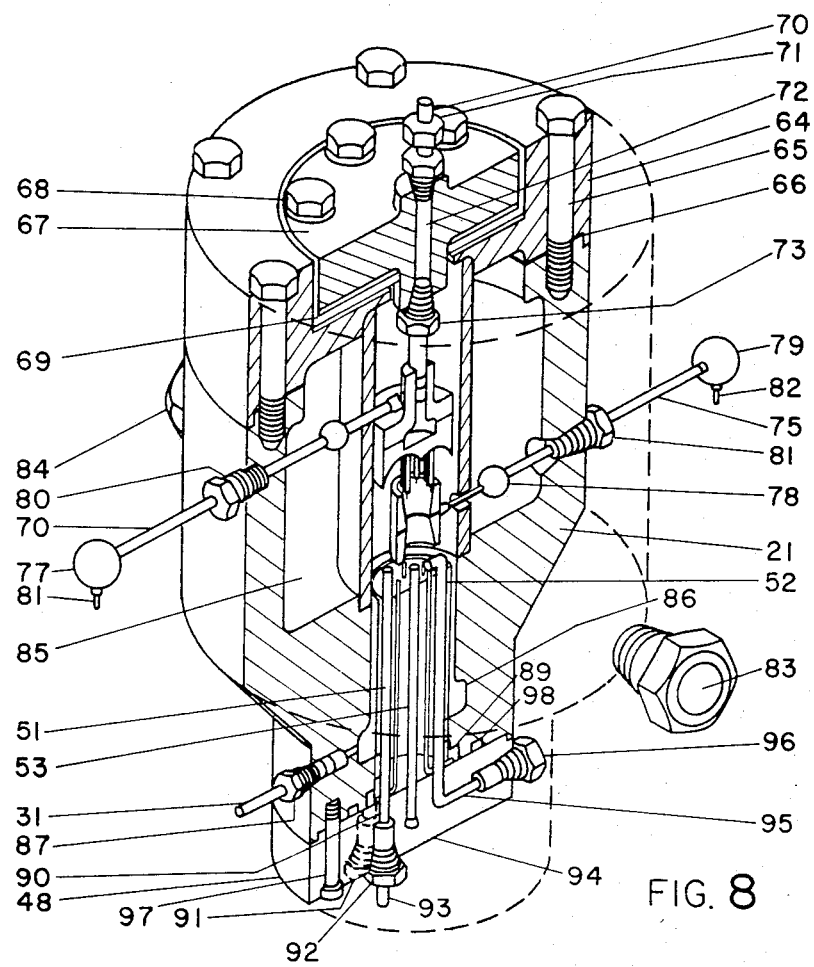
FIG. 8 is a perspective cross section of a TORON ETD Charged Aerosol Heat/Electric Generator.
Figure 9:
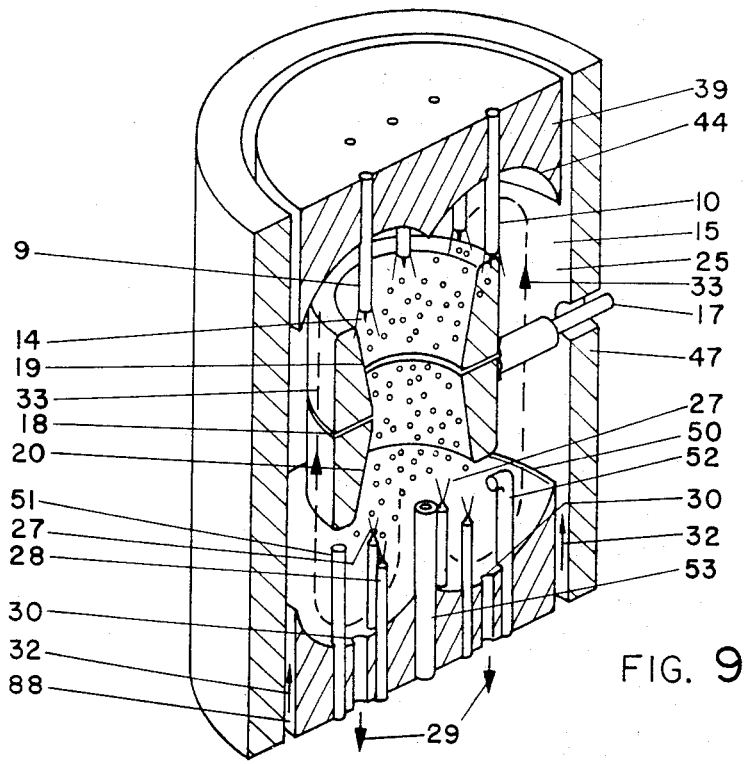
FIG. 9 is a perspective cross sectional magnified view of a TORON ETD Charged Aerosol Heat/Electric Power Generator, which has been described in connection with FIGS. 3–8, inclusive.

A single jet converter using Mehod II is shown in section in FIG. 1, in a perspective cutaway view in FIG. 9 and in an enlarged view in FIG. 10. A boiler and superheater supplies superheated vapor to power a high molecular weight vapor jet, which drives a low molecular weight gas having a high electrical breakdown strength, in an ETD gas flywheel converter. Component details are shown in FIGS. 3-7 inclusive. The thermal circuit is shown in FIGS. 1 and 8. The exit vapor is condensed to a liquid and recirculated back to the boiler and the gas is returned to the TORON. The carrier gas preferably uses hydrogen or helium with a vapor of the fluorocarbon fluid such as $C_8F_{16}O$, which has a molecular weight of 416 and an electrical breakdown strength relative to air $b_g=4.2$; or a fluorocarbon fluid having a molecular weight of 820, for which $b_g$ may be even greater. The carrier gas may contain $CCl_4$ for which $b_g=20$.

FIGS. 11 through 18 show graphical results of the mathematical physics analysis of Method II hereinafter described.

FIG. 1 shows a diagram of a TORON ETD Generator in section. In the figure the thermal system is generally indicated by 1 and comprises a condenser 2 for condensing the input vapor 28 from the TORON generator 21, and a separator 2' to return the gas to the generator. Cooling water 2" at temperature $T_c$ is supplied to the condenser and exits at 2''' to carry away heat power $P_{HC}$ removed from the condensing vapor. The condensed water at temperature $T_c$ is supplied to a boiler pump 3, which is supplied with mechanical power $P_p$. The pump 3 supplies water under pressure to the boiler 4. The boiler vaporizes the water being supplied with input heat power $P_{hb}$ at temperature $T_b$ and the saturated water vapor is then fed to superheater 5 which is supplied with heat power $P_{hs}$ at temperature $T_s$.

The ends of the insulating tubes 7 and 8 are sealed to emitter tubes 9 and 10. The superheated steam passes via pipe 6, insulated tubes 7 and 8, and through emitter tubes 9 and 10. Superheated vapor jets 11 and 12 issue into the carrier gas 13 from orifices in tubes 9 and 10. A small diameter tungsten wire is threaded through the insulating tube 7 and the emitter tube 9 and protrudes to provide an emitter point 14 centered within the jet 11. In a similar manner the emitter point 15 protrudes from the emitter tube 10 and is centered within the jet. The generator body 21 may be; for example, a stainless steel cylinder shown in section in FIG. 1 and in cross section in FIG. 2. The generator body 21 is grounded at 22. An insulating tube 16 containing an electrical lead 17 passes through and is sealed to the generator body 21, and the lead is connected to the ring exciter electrode 18. A converging duct 19 and a diverging duct 20 are spaced and supported within the TORON 25, and a nozzle throat is formed between them. The exciter electrode 18 is placed at the throat of the converging-diverging ducts. A potential source 23 is connected between the exciter electrode 18 and the emitter points 14 and 15. A charged aerosol 24 is formed within the jet stream 11 by the condensation of vapor onto ions emitted from the point emitters 14 and 15. Within the converging duct 19, which is also termed the "ejector section", the vapor jets 11 and 12 impart their kinetic power to the carrier gas 13 and spread it over the entire cross sectional area at the nozzle throat 18. In the diverging section 20, termed the "converter", the charged aerosol 24' transduces the kinetic power to electrical power as described in my patent, U.S. Pat. No. 2,638,555. The charged aerosol 24' is discharged at the exit plane 26 of the converter 20 by ions of opposite polarity 27 introduced from collector point electrodes 28, which are mounted in the generator body, and are at ground potential. The excess water and vapor 29 from the charged aerosol gas exits through the ports 30 and passes via the pipe 31 to the condenser-separator 2,2'. In the condenser-separator 2,2' the vapor 29 is condensed to a liquid but the gas 32 is returned via the pipe 31 to the circulating carrier gas flow within the TORON 25.

FIG. 2 shows a section on the XY plane through the throat 18 of the converging-diverging section 19 and 20.

In a preferred embodiment, at the exit cross sectional area 26, the diameter $D_4$ of the converter 20 is nearly equal to the outer diameter $D_4$ of the elements 19 and 20. The constant interior diameter of the TORON, $D_5$ is such that the annular cross sectional area between diameters $D_4$ and $D_5$ equals the exit area 26 of the diameter $D_4$; as explained hereinafter. This configuration enables a constant thermodynamic state to exist throughout the circulating gas flow 33, except for the slight pressure loss around the circuit due to friction. The ejector section 19 preferably operates in the constant thermodynamic state, in which the velocity of the gas and its dynamic pressure increase. Conversely, in the diverging electrical converter section 20, electrical power is extracted through the medium of the charged aerosol 24', its gas-aerosol velocity is decreased, and its dynamic pressure decreased, as electrical power is delivered to the electric circuit. Since the annular area of the duct between diameters $D_4$ and $D_5$ is constant and equal to the area of the exit plane 26, there is no diffuser, and hence no diffuser pressure loss of the circulating gas. The electric circuit used is preferably the uni-electrode circuit described in my Patent, U.S. Pat. No. 4,206,396.[18] This employs the high potential emitter points 13, a floating exciter source 23, and a grounded collector. The load 34 is connected between the grounded body 21 of the device and the emitter points 14 and 15. The charged aerosol is discharged by the collector points 28 which emit ions 27 of opposite polarity, and which discharge the charged aerosol 24' at the exit plane 26 of the electrical converter section 20.

Referring now to the ejector section 19, the jets 11 and 12 issue from the orifices in the emitter tubes 9 and 10 with a velocity only slightly greater than the velocity of the carrier gas. For efficient kinetic/electric power transduction, the velocity of the carrier gas at the throat 18 should be on the order of 100 m/s; therefore, the velocity of the jets 11 and 12 should be only slightly greater than this. To obtain a high efficiency thermal cycle, preferably in one or a few stages, it is necessary to employ a high molecular weight vapor. To minimize friction, a low molecular weight gas is used for the carrier gas. A small percentage of high electric breakdown strength gas is mixed with the carrier gas. These relationships are more fully explained in the mathematical physics section.

FIG. 3 shows a single stage TORON ETD Generator. The same numbers used in FIGS. 1 and 2 apply to the elements of this generator. In the figure, an insulating tube 7 of sapphire is sealed to a stainless steel upper emitter block 35. The sapphire-stainless steel seal comprises a molybdenum and copper plasma-sprayed coating 36 applied to the outer surface of the sapphire tube 7. A copper coating is also applies by plasma-spray to the interior of the stainless steel emitter block 35 at 37 and the 2 copper coated surfaces are brazed together as by a silver braze at 38.

The upper emitter block 35 is fastened to a lower emitter block 39 by the Allen head screws 40 and the 2 blocks are sealed by a suitable gasket 41 which may be a metal gasket ring which is compressed between the upper and lower emitter blocks 35 and 39. A chamber 42 is formed between the blocks 35 and 39 and is connected by the hole 43 to the sapphire tube 7. The emitter tubes 9 and 10 are mounted with their ends within the chamber 42 so that superheated vapor will pass through the inside of these tubes and be emitted as vapor jets 11 and 12. The lower emitter block 39 forms the end 44 of the TORON surface which facilitates the return of the circulating carrier gas 33 and provides the carrier gas 13 which enters the converging ejector section 19. The vapor jets 11 and 12 increase the velocity and dynamic pressure, while maintaining the static pressure constant. Thus, the kinetic power of the vapor jets 11 and 12 which was initially concentrated over the small area of the interior of the nozzles of the emitters 9 and 10, mixes with the carrier gas 13 and is spread over the entire nozzle throat area at 18. Charged aerosol 24 is formed in accordance with the description in FIG. 1, and the kinetic power of the mixed gas aerosol stream is transduced to electrical power in the electrical converter section 20 and discharged at the end plane 26 by ions of opposite polarity 27 from the collector points 28 which are at ground potential. The entire upper and lower emitter blocks 35 and 39 and the emitter tubes 9 and 10 and the emitter points 14 and 15 are all at high potential relative to ground. Electrical power is extracted via lead 45 which connects to the upper emitter block 35 and ultimately to the emitter points 14 and 15. Thermodynamic conditions are adjusted so that the kinetic power remaining at the exit plane 26 is less than 20% of the total kinetic power at the nozzle throat 18, the difference being converted to electrical power through the medium of the charged 24 in the converter space 20. Thermodynamic conditions are further set so that the velocities of the vapor jets 11 and 12 are only slightly greater than the velocity of the carrier gas 13 at the entrance plane 46 to the ejector 19. The exciter electrode 18 is connected via the lead 17 to a source of exciter potential as shown in FIG. 1. In FIG. 3, a glass tube 47 and glass or quartz elements 19 and 20 are employed to facilitate visual inspection of the device. However, where such visual inspection is not required, 47 may comprise a metal tube.

The collector block 48 is made of stainless steel and there is an annular space 49 between the collector block 48 and the inner surface of the tube 47 through which the return gas 21 flows back to the circulating carrier gas vapor 33. The surface 50 forms the other end of the TORON. Mounted on the surface 50 are the point collector electrodes 28 and which are connected to ground through the collector block 48. The collector block 48 also contains the exit ports 30 through which the vapor, gas and liquid pass to the condenser separator 2,2' as shown in FIG. 1. Temperature sensor 51, static pressure sensor 52 and dynamic pressure sensor 53 are also mounted on the collector block 48.

FIGS. 4, 5, 6, and 7 are sub-assembly views of the emitter section comprising the upper emitter block 35, lower emitter block 39, the vapor chamber 42, emitters 9 and 10 and emitter points 14 and 15. It will be understood that while only 2 emitter tubes 9 and 10 are designated by those numbers, in actuality there is a cluster of 19 tubes in the present example, emitter points and tubes which cluster is generally indicated as 54 in FIG. 5, which is a bottom view of FIG. 4. The upper part of the emitter tube 9 has a cap 55 which contains openings 56. The tungsten wire comprising the emitter point 14 is welded at the end 57 of the cap 55. Steam passes through the openings 56 through the interior of the tube 9 and exits at the small converging diverging orifice 58 in nozzle 59 which is attached to the end of the tube 9, for example by a weld or braze 60. The tungsten wire comprising emitter point 14 may be centered by a small wire coil 61.

Referring now to FIG. 9, the generator body 21 serves to mount and separate the generator components previously described. A top end block 64 is bolted by a bolt 65 to the top end of the generator body 21. A gasket 66 is clamped between the generator body 21 and the top end block 64. Mounted within the top end block 64 is a leadin block 67 which is bolted to the top end block 64 by the bolts 68. An insulating gasket 69 is clamped between leadin block 67 and the top end block 64. A vapor inlet pipe 70 which is at ground potential is attached via the fitting 71 to the leadin block 68 and the vapor passes via the hole 72 in the leadin block 67 to a lower fitting 73 which is sealed to the sapphire insulating leadin tube 7. The lower end of the sapphire tube 7 is sealed to the upper emitter block 35 as previously described in connection with FIG. 3 which shows vapor entering the steam chamber 42 and eventually issuing from the emitter tubes 9 and 10 as jets 11 and 12 in the presence of ions emitted from the emitter points 14 and 15.

The leadin block 67 is separated by an insulating gasket 69 to prevent excessive heat loss from the input vapor entering the pipe 70 and passing out into the device via the hole 72. Thus, the block 67 may be at a high temperature while the generator body 21 may be at a much lower temperature, heat flow between the two elements being prevented by the insulating gasket 69. In a like manner the bolts 68 are insulated by suitable sleeves and gaskets, not shown, from the upper block 64. A pressure sensor and temperature sensor, not shown, are attached to the vapor inlet tube 70 in proximity to, but external to the leadin fitting 71. The electrical connections 45 to the upper emitter block 35 and the electrical lead 17 to the exciter ring 18 are made via sapphire tubes 74 and 75. The sapphire tube 74 is sealed to stainless steel spheres 76 and 77 and the sapphire tube 75 is sealed to the stainless steel spheres 78 and 79. Stainless steel taper thread screwin fittings 80 and 81 are also sealed to the sapphire tubes 74 and 75. The sapphire stainless steel seal has been previously described. Wires passing through the sapphire tubes 74 and 75 connect the inner and outer stainless steel spheres 76 and 77 and 78 and 79, respectively, to each other. Electrical leads 82 and 82a respectively, connect to the spheres 77 and 79 to provide connections to the emitter and exciter electrodes. The collector block 48 is at ground potential along with the entire generator body 21, which also serves to provide various leadin connections as described hereinafter.

The device shown in FIG. 9 is a single TORON device, the operation of which may be viewed through external sight glass ports 83 and 84 which permit vision through the glass tube 47 and the glass ejector 19 and the converter 20. The vapor pressure and temperature within the inlet pipe 70 and within the vapor chamber 42 may be high, while the vapor pressure and temperature within the TORON 25 and the inner chamber 85 and the generator body 21 is much lower. The lower block 48 is inserted into the generator body 21 forming an annular chamber 86. The return gas flow pipe 31 is mounted by a taper screw fitting 87 into the lower portion of the generator body 21 and communicates with the chamber 86. The return gas flow is via the pipe 31, fitting 87, annular chamber 86 and annular space 88 which communicate with the circulating TORON flow 33 as shown in FIG. 10. The ports 30 receive the exiting gas vapor liquid which passes out through the holes communicating with a lower chamber 89 and then passes out through a hole 90 via taper screw fitting 91, partially hidden. Temperature sensor 51 passes through taper fitting 92 and is connected via electrical leads 93 to the instrumentation panel. The dynamic pressure 53 connects via a hole to another taper screw fitting (not shown as it is totally hidden), the position being indicated by the arrow 94 to the lower block 48. Similarly, the static pressure sensor 52 is connected via hole 95 to taper screw fitting 96 and thence to a pressure sensor not shown. The lower block 48 is bolted to the generator body 21 by bolts 97 and sealed therefrom by a suitable gasket 98, for example a compressed metal spring gasket of the type well known in the art.

Referring now to FIG. 8, there is shown a diagram of the TORON circulation using Method II and employing the apparatus shown in FIGS. 1–10 inclusive. This diagram shows the flow of the gas, vapors, and the charged aerosol through the system, generally shown in FIG. 1. This diagram relates the circulation and the corresponding mass flow rates. A mathematical physics analysis of this flow diagram is subsequently described. In the diagram, 19 is the ejector, 20 is the ETD converter; the flow from the ETD converter separates at 0, a portion of the vapor or carrier gas returning in loop 33 to the ejector 19 at inlet plane $2^p$. A charged aerosol 24 is formed and the kinetic power from the jets 12 is distributed over the throat 18 and delivered to the entrance plane $3^p$ to the ETD converter 20. In the ETD converter 20, the charged aerosol 24' converts most of the kinetic power between the entrance plane $3^p$ and the exit plane $4^p$ to electrical power output indicated by the arrows 62. At the exit plane $4^p$ of the ETD converter 20, the flow diverges at 0 and returns to the circulating flow of the carrier gas 33; the balance of the gas vapor liquid flow entering the condenser 2 and the separator 2'. At the separator 2' the liquid flow 31 returns via pipe 31 and the residual vapor returns via loop 32 and mixes with the return flow 33 at juncture 63 which is returned to the ejector 19 at the entrance plane $2^p$.

FIGS. 1–10 show an ETD Heat/Electric Power Generator operating according to Method II. The mathematical physics relationships derived for Method II are summarized in the graphs shown in FIGS. 11–15 inclusive, which are fully described in connection with the mathematical physics analysis hereinafter presented.

TABLE OF SYMBOLS

| | |
|---|---|
| a | distance along z axis to entrance area of conversion space |
| $a' \equiv$ | $\frac{1}{2}(\gamma + 1)$ |
| $a_o$ | distance along z axis to orifice area |
| b | distance along z axis to exit area of conversion space |
| $b_g$ | ratio of electric breakdown potential of a given gas compared to that of air at standard conditions; or relative electric breakdown gas factor. The electric breakdown of air at standard conditions is taken as $3.08 \times 10^6$ volts/m. This is correct within 3%. |
| e | electron charge = $1.6 \times 10^{-19}$ Coulombs |
| f | friction coefficient |
| $f(M) \equiv$ | $\frac{1}{2}\gamma M^2(1 - M^2)/[1 + \frac{1}{2}(\gamma - 1)M^2][1 + \frac{1}{2}(\gamma + 1)M^4] \approx \frac{1}{2}\gamma M^2$ for $M < 0.3$ |
| f(s) | entropy function |

TABLE OF SYMBOLS-continued

| | | | |
|---|---|---|---|
| h | enthalpy of vapor J/kg | | |
| i | current density amps/$m^2$ | | |
| $k_1'$ | $-(\rho_1 L/\epsilon_o)\{1/\Gamma(b/a) - 1](m + 1)a^{m+1}\}$ | | |
| $k_1$ | $(\epsilon_o b_1^2/\delta_1)^{\frac{1}{2}}$ | = | 8.22 |
| $k_2$ | $(\frac{1}{2}\epsilon_o^{3/2} b_1^3/\delta_1^{\frac{1}{2}})$ | = | 327.8 |
| $k_3$ | $(2\epsilon_o b_1^2/\delta_1^2)^{1/5}$ | = | 2.583 |
| $k_4$ | $k_2^{-2/5}$ | = | 0.0986 |
| $k_5$ | $\frac{1}{2}(\epsilon_o b_1^2)$ | = | 39.84 |
| $k_6$ | $(8315\delta_1/\Omega_{aa}) = 8315 \times 1.10/30 = 305$ | | |
| $k_7$ | $k_5 k_6 = \frac{1}{2}(\epsilon_o b_1^2/\delta_1(\Omega_{aa}/8315) = 0.131$ | | |
| $k_a$ | ratio of electric breakdown potential of a gas with a charged aerosol under given particle concentration, radii, charge and velocity, compared to that of the gas only at the same density; or relative electric breakdown aerosol factor. | | |
| ln | natural logarithm | | |
| m | mass kg; also an exponential number | | |
| $m_{r2} \equiv$ | $\Omega/\Omega_{aa}$ molecular weight relative to air | | |

Single Fluid Method I—Constant Charge Density and Constant Thermodynamic State This analysis of prior art Method I shows that for high velocity gas jets required for efficient thermodynamic cycles, only a small proportion of the kinetic power of the jet could be converted to electric power; and that efficient conversion can only be obtained with low velocity flows.

For constant thermodynamic state with constant charge density $$p_e = (b_1 b_g k_a)^2 (\epsilon_o/2)\delta_a^2 U \quad (1)$$

$$p_e = [(3\times 10^6)^2 \times 8.854\times 10^{-12}/2]\delta_a^2 \times U = 39.8\delta_a^2 U \quad (2)$$

$$p_k = (\delta_1 \delta_a m_r/2)U^3 \quad (3)$$

$$p_e/p_k = (\delta_o b_1^2/\delta_1)[(b_g k_a)^2/m_r]\delta_a/U^2 \quad (4)$$

For steam $$p_e/p_k = (39.8/0.625\times 1.177/2)(\delta_a/U^2) \quad (5)$$

$$p_e/p_k = 108.2\delta_a/U^2 \quad (6)$$

Assuming the steam jet has a velocity of 1800 m/s, from (6):

$$p_e/p_k = 3.34\times 10^{-5}\delta_a \quad (7)$$

For $\delta_a = 10$, only 0.0334% of the kinetic power is converted to electric power using Method I, in this example.

Methods II and III were invented to enable efficient ETD conversion which requires $1 > p_e/p_k > 0.1$.

Mixed Flow Method II

This is an analytical study of an electrothermodynamic (ETD) Generator comprising a gas flywheel, and a charged aerosol as a transducer, with Method II.

Overall Efficiency and Loss Coefficients $\zeta_1$ and $\zeta_2$

Considered as a "black box" O shown in FIG. 8, the heat power input $P_h$ is converted via the thermal cycle TH to an input kinetic power $P_{k1}$, which occurs due to a decrease in enthalpy, in S.I. units:

$$P_{k1} = m_1 \Delta h \quad (8)$$

which is the input to the black box O. The outputs are the electric power $P_e$ and all the power losses $P_{L1}$ and $P_{L2}$.

$$P_{k1} = P_e + P_{L1} + P_{L2} \quad (9)$$

The gas flywheel cycle is shown within the box O. At point 1,2 input kinetic power $P_{k1}$, and the circulating residual kinetic power $P_{k2}$ meet, and deliver a power $P_{k3}$ to the charged aerosol kinetic/electric converter between points 2 and 4. The electric power output $P_e$ is some fraction $\eta$ of the kinetic power $P_{k3}$ delivered to the converter at 3.

The electric power is extracted in the constant thermodynamic state. The power loss $P_{L1}$ is the ejector friction power loss which is a fraction $\zeta_1$ of the input kinetic power $P_{k3}$ at the entrance to the converter $$P_{L1} = \zeta_1 P_{k3} \quad (10)$$

$$P_e = \eta P_{k3} \quad (11)$$

The residual kinetic power at the converter exit is $$P_{k4} = (1-\eta)P_{k3} \quad (12)$$

The power losses $P_{L2}$ include those due to friction, turning, diffuser (if any) and exhaust. The remaining kinetic power, after subtracting all these losses, is the circulating kinetic power $P_{k2}$. The sum of the power losses $P_{L2}$ is a fraction $\zeta_2$ of the residual power $P_{k4}$; and $\zeta_2$ is a "lumped loss coefficient".

$$P_{L2} = \zeta_2 P_{k4} = \zeta_2(1-\eta)P_{k3} \quad (13)$$

where $0 \leqq \zeta_2 \leqq 1$

The overall kinetic/electric conversion efficiency of the gas flywheel is defined:

$$\xi \equiv P_e/P_{k1} \quad (14)$$

From (9) and (11)

$$\xi = P_e/(P_e + P_{L1} + P_{L2}) \quad (15)$$

From (10), (11), and (13):

$$\xi = \eta P_{k3}/[\eta P_{k3} + \zeta_2(1-\eta)P_{k3} + \zeta_1 P_{k3}]$$

$$\xi = 1/[1 + \zeta_2(1-\eta)/\eta + \zeta_1/\eta] \quad (16)$$

This is a new result. Each factor $\zeta_1$ and $\zeta_2$ will be separately considered. Equation (16) is plotted showing the overall efficiency $\xi$ vs. The kinetic/electric conversion efficiency $\eta$ for various values of $\zeta_2$, and for constant values of $\zeta_1 = 0.1$ and $\zeta_1 = 0.5$ in FIGS. 11 and 12, respectively.

ANALYSIS OF CIRCULATING MASS FLOWS IN THE TORON MODEL ETD GENERATOR

Referring to FIG. 8, at 0 the stream is divided into a mass flow $\dot{m}_4$ of proportion x which passes via the TORON exit to the condenser and to a mass flow $\dot{m}_5$ of proportion $1-x$ which is recirculated back to station 2. After passing through the condenser, most of the vapor is condensed to a liquid. From a circuit analysis of the flow for the exit ratio x in terms of $\lambda = \dot{m}_1/\dot{m}_2$ and the vapor/gas ratio $R_{VG}$ there is derived:

$$x = \{[(1/R_{VG}) + 1]\}/[(1/\lambda) + 1] \quad (17)$$

EXAMPLE 1

$\lambda = 0.2$;
$R_{VG} = 2$
$x = [(\frac{1}{2}) + 1]/(5 + 1) = 0.25 \ (25\%)$

EXAMPLE 2

It is known that the average molecular weight $\Omega_a$ is given by:

$$\Omega_a = \Omega_1 / [x(\Omega_1/\Omega_2) + (1-x)]$$

From this it follows:

$$\Omega_a = 3.5/[0.25(3.5/18) + 0.75]$$

$$\Omega_a = 4.38$$

Hence, a mixture of 25% steam vapor with 75% of a carrier gas comprising hydrogen $H_2$ and a fluorocarbon (FC-70) having an average molecular weight of 3.5, results in a new mixture having a new average molecular weight of 4.38.

EJECTOR EFFICIENCY AND POWER LOSS COEFFICIENT $\zeta_1$

The ejector efficiency $\xi_1$ is defined:

$$\xi_i = P_{k3}/(P_{k2} + P_{k1}) = \text{(kinetic power out/kinetic power in)} \quad (18)$$

$$\xi_1 = P_{s3} U_3 A_3 / (P_{s1} U_1 A_1 + P_{s2} U_2 A_2) \quad (19)$$

For a converging ejector in the constant thermodynamic state:

$$A_2 U_2 = A_3 U_3 \quad (20)$$

This is the reverse of the converter: here power is added by jet kinetic power $P_{k1}$; there is little change in static pressure and temperature. The increase in gas-vapor velocity at plane 3 provides an increase in kinetic power across a smaller area, less power loss due to friction.

$$P_{k12} = (P_{s1} A_1) U_1 + (P_{s2} A_2) U_2 = P_{k1} + P_{k2} \quad (21)$$

The kinetic power at plane 3 is:

$$P_{k3} = (P_{s3} A_3) U_3 \quad (22)$$

Let $$P_{s3} = (P_{s2} + \Delta P_{123}) \quad (23)$$

Hence:

$$\xi_1 = (P_{s2} + \Delta P_{123}) A_3 U_3 / (P_{s1} A_1 U_1 + P_{s2} A_2 U_2) \quad (24)$$

Define $\chi_i \equiv$ the ratio of $\Delta P_{123}$ Pressure Increase to $P_{s2}$ Stagnation Pressure at 2

$$\chi_i = (P_{s3} - P_{s2})/P_{s2} = \Delta P_{123}/P_{s2} \quad (25)$$

$$(P_{s3}/P_{s2}) = 1 + (\Delta P_{123}/P_{s2}) = 1 + \chi_i \quad (26)$$

From (18), (20), and (24), the ejector efficiency is:

$$\xi_1 = (1 + \chi_i)/[(P_{k1}/P_{k2}) + 1] \quad (27)$$

$$(P_{k1}/P_{k2}) = \tfrac{1}{2} \dot{m}_1 U_1^2 / \tfrac{1}{2} \dot{m}_2 U_2^2 = \lambda s_{12}^2 \quad (28)$$

Hence, since $\chi_i \ll 1$ $$\xi_1 \approx 1/(1 + \lambda s_{12}^2) \quad (29)$$

The power loss coefficient $\zeta_1$ is defined:

$\zeta_1 \equiv$ ejector power loss/power in = (power in-power out)/power out $$\zeta_1 = P_{L1}/P_{k3} \quad (30)$$

$$\zeta_1 = (P_{k1} + P_{k2} - P_{k3})/P_{k3} \quad (31)$$

$$\zeta_1 = [(1/\xi_1) - 1] \quad (32)$$

From (32):

$$\xi_1 = 1/(1 + \zeta_1) \quad (33)$$

Comparing (29) and (33), there is obtained the important new result:

$$\zeta_1 \approx \lambda s_{12}^2 \quad (34)$$

EXAMPLE

Given $\lambda = 0.2$
$s_{12} = 1.12$

Find

Ejector Efficiency $\xi_1$; Ejector Loss Coefficient $\zeta_1$

Answer

From (23):

$$\xi_1 = 1/(1 + 0.2 \times 1.12^2) = 0.80 \ (80\%)$$

From (34):

$$\zeta_1 = \lambda s_{12}^2 = 0.2 \times 1.12^2 = 0.25$$

An Analytical Study of the Charged Aerosol Gas Flywheel ETD (Electrothermodynamic) Generator

THE ETD CONVERTER

For small or zero mobility charged droplets, there is no loss in the conversion of kinetic power to electric power at constant thermodynamic state; that is, conversion with no change in density, temperature and pressure between planes 3 and 4 in FIG. 14. This may be expressed as:

$$(\tfrac{1}{2}) U_3^2 = (\tfrac{1}{2}) U_4^2 + IV/\dot{m}_3 \quad (35)$$

where $U_3$, $U_4$ are the velocities at the entry and exit planes 3 and 4, I the current, V the voltage and $\dot{m}_3$ the mass flow rate.

The conversion efficiency $\eta$ is $$\eta = IV/\tfrac{1}{2} U_3^2 \dot{m}_3 = 1 - (U_4/U_3)^2 \quad (36)$$

By continuity $$U_3 A_3 = U_4 A_4 \quad (36.1)$$

where $A_3$ is the entrance and $A_4$ the exit cross sections of the conversion section; hence:

$$\eta = 1 - (A_3/A_4)^2 \tag{37}$$

The maximum electric field strength is attained at the entrance plane 3, and is limited by breakdown conditions to a value $$E_b = b_1 b_g k_a \delta_a \tag{38}$$

$$= 3 \times 10^6 b_g k_a \delta_a \quad \text{V/m} \tag{39}$$

It can be shown from the Bernoulli and Poisson equations[19] that the dimensionless ratio $\epsilon_o E_b^2/m_r \delta_1 \delta_a U_3^2$, which is a measure of electrostatic energy density to the kinetic energy density satisfies, in the particular case of constant thermodynamic state for a diverging duct, the relation $$\eta = \epsilon_o E_b^2/m_r \delta_1 \delta_a U_3^2 = 2 \ln (A_4/A_3) \tag{40}$$

$$\eta = 1 - \exp[-\kappa_o (b_1 b_g k_a)^2 \delta_a / m_r \delta_1 U_3^2] \tag{41}$$

Solving for $U_3$ $$U_3 = (\epsilon_o b_1^2/\delta_1)^{\frac{1}{2}} (b_g k_a/m_r^{\frac{1}{2}}) \beta_1(\eta) \delta_a^{\frac{1}{2}} \tag{42}$$

The electric power per unit area $p_e$ is:

$$p_e = IV/A = (\tfrac{1}{2}) \eta U_3^3 m_r \delta_1 \delta_a \tag{43}$$

from (42) and (43) $p_e$ is obtained in terms of $\delta_a$ and $\beta_2(\eta)$.

Eliminating $\delta_a$, $U_3$ is obtained in terms of $p_e$ and $\beta_3(\eta)$:

The functions $\beta_1(\eta)$, $\beta_2(\eta)$, $\beta_3(\eta)$, and $\beta_4(\eta)$ are plotted vs. $\eta$ in FIG. 13.

The relationships between $U_3$, $p_e$, and $\delta_a$ may now be expressed in simple form:

$$U_3 = k_1 \epsilon_1 \beta_1(\eta) \delta_a^{\frac{1}{2}} \tag{44}$$

$$p_e = k_2 \epsilon_2 \beta_2(\eta) \delta_a^{5/2} \tag{45}$$

$$U_3 = k_3 \epsilon_3 \beta_3(\eta) p_e^{1/5} \tag{46}$$

$$\delta_a = k_4 \epsilon_4 \beta_4(\eta) p_e^{2/5} \tag{47}$$

Using a hydrogen fill gas having 10 to 40% $C_8F_{16}O$, a gas mixture results which has a small density, a large electrical breakdown strength and a greater velocity than steam or air. The large gas-vapor velocity may be matched to a supersonic vapor jet having a molecular weight of 200 or more. The relatively small gas density of this mixture enables the driver jet to exit at a smaller pressure. The single stage thermal cycle employing this combination is more efficient; and results in a greater electric power density output. The values of $\epsilon_1$, $\epsilon_2$, $\epsilon_3$, and $\epsilon_4$ are shown in Table No. 1.

FIG. 14 shows log-log graphs of output electric power density $p_e$ and converter entrance velocity $U_3$ versus the relative gas-vapor density $\delta_a$; for values of the electric/kinetic power conversion ratio $\eta$ from 0.1 to 0.8, for a fill gas having an average molecular weight $\Omega_a = 3.5 (m_r = 0.123)$ and a $b_g = 2$, for a composition 40% $C_8F_{16}O$-60% $H_2$.

Average $\gamma$ for Mixed Gas Flow

From previous work, in our notation[15.1]

$$\gamma_3 = (\lambda' \gamma_1 + \gamma_2)/(1 + \lambda') \tag{47.1}$$

$$\lambda' = m_1'/(m_1' + m_2') = x'/(1 - x') \tag{47.2}$$

EXAMPLE

Given: $x' = 0.40$ (Table I); $\gamma_1 = 1.03$ (fluorocarbon); $\gamma_2 = 1.41$ (hydrogen)
Find: $\gamma_3$
From (47.2)

$$\lambda' = 0.4/(1 - 0.4) = 0.67$$

From (47.1)

$$\lambda_3 = (0.67 \times 1.03 + 1.41)/(1 + 0.67) = 1.26 \text{ Answer}$$

TABLE NO. 1

Values of Coefficients $\epsilon_1$, $\epsilon_2$, $\epsilon_3$ and $\epsilon_4$ for Various Gases and Vapors

| | Molecular Weight | Electric Breakdown strength at 1 atm & 300° K. relative to air | Velocity coefficient (for $\delta_a$) | Power Coefficient | Velocity Coefficient (for $p_e$) | Relative Density Coefficient |
|---|---|---|---|---|---|---|
| Formula | mol. wt. | $m_r$ | $b_g$ | $\epsilon_1 = \dfrac{b_g k_a}{m_r^{\frac{1}{2}}}$ | $\epsilon_2 = \dfrac{(b_g k_a)^3}{m_r^{\frac{1}{2}}}$ | $\epsilon_3 = \left(\dfrac{b_g k_a}{m_r}\right)^{2/5}$ | $\epsilon_4 = m_r^{1/5}/(b_g k_a)^{6/5}$ |
| Independent variable | | | | $\delta_a$ | $\delta_a$ | $p_e$ | $p_e$ |
| Dependent variable | | | | $U_3$ | $p_e$ | $U_3$ | $\delta_a$ |
| Gas or Vapor | | | | | | | |
| Hydrogen | 2 | 0.07 | 0.6 | 2.26 | 0.816 | 2.36 | 1.08 |
| Steam | 18 | 0.629 | 1. | 1.26 | 0.248 | 1.2 | 0.88 |
| Air | 28.6 | 1.0 | 1. | 1. | 1. | 1. | 1. |
| $C_8F_{16}O$ (FC-75) | 416. | 14.5 | 4.2 | 1.10 | 19.4 | 0.609 | 0.238 |
| (FC-70) | 820 | 28.6 | 8 | 1.50 | 17.9 | 0.601 | 0.162 |
| $H_2 + C_8F_{16}O$ | | | | | | | |
| 60%  40% | 3.5 | 0.123 | 2* | 5.70 | 22.8 | 3.05 | 0.286 |
| 33.3% | 3.0 | 0.105 | 1.8* | 5.55 | 18.0 | 3.11 | 0.315 |
| 12% | 2.2 | 0.080 | 1.25* | 4.42 | 6.9 | 3.00 | 0.461 |

*Extrapolated values.
From this Table, the advantage of $H_2$ mixed with $C_8F_{16}O$ are apparent: greater power density, greater velocity and decreased gas density.

AVERAGE MOLECULAR WEIGHT FOR A GAS MIXTURE

An equation for the average molecular weight of a mixture of gas has previously been derived[15.2] in terms of the mass flow ratio $\lambda = \dot{m}_1/\dot{m}_2$ $$\Omega_a = (\lambda+1)/[(\lambda/\Omega_1)+(1/\Omega_2)] \quad (48)$$

To express $\Omega_a$ in terms of x, the proportion by weight of component 1, let $$x = \dot{m}_1/(\dot{m}_1+\dot{m}_2) = \lambda/(\lambda+1) \quad (49)$$

From which, solving for x:

$$x = [1-(\Omega_2/\Omega_a)]/[1-(\Omega_2/\Omega_1)] \quad (50)$$

EXAMPLE

Given

1. $\psi_1 = 820 \quad \psi_2 = 2 \quad x = 0.5\ (50\%)$
2. same with $\quad x = 0.9\ (90\%)$ Find $\Omega_a$ for 1. and 2.

Answer

From (48) the average molecular weights $\Omega_a$ are:
1. $\Omega_a = 2/[0.5(2/820)+0.5] \approx 4$
2. $\Omega_a = 2/[0.9(1/410)+0.10] = 20$

EXAMPLE

Steam and FC-70 versus x

Given $\Omega_1 = 820$
$\Omega_2 = 18$

Find

1. $(1-x)$ Proportion of steam for vapor to have average molecular weight $\Omega_a = 200$.
2. Same as 1. for $\Omega_a = 400$.
3. Sonic velocity for 1. and 2. at 900° K.

Answer

From (50):
1. $x = [1-(18/200)]/[1-(18/820)] = 0.930$; $100(1-x) = 7\%$
2. $x = [1-(18/400)]/[1-(18/820)] = 0.9764$; $100(1-x) = 2.36\%$

PRESSURE DIFFERENTIALS

In an earlier paper[15.3] using compressible fluid flow theory the ratio of the stagnation pressures in an ejector was shown to be (in our notation):

$$P_{s3}/P_{s2} = \frac{P_s(M_3)}{P_s(M_2)} \cdot \frac{1 + \lambda \frac{R_1 T_{s1}^{\frac{1}{2}}}{R_2 T_{s2}^{\frac{1}{2}}} \frac{\mu(M_2)}{\mu(M_1)}}{1 + \frac{A_1}{A_2}} \quad (51)$$

For a supersonic jet issuing into a gas flywheel having a fill gas-vapor of small molecular weight, and $M_2 < 0.1$ Mach:

$$[P_s(M_3)/P_s(M_2)] \approx 1 \quad (52)$$

Table 2 shows values of $\mu(M_1)$ for various gases and vapors at $M_1 = 2.2$:

TABLE 2

$\gamma$ and $\mu(M_1)$ for Various Gases and Vapors at $M_1 = 2.2$ Mach

| Gas Vapor | $\gamma$ | $\mu(M_1)$ |
|---|---|---|
| Mercury | 1.66 | 0.5 |
| Steam | 1.33 | 0.46 |
| Fluorocarbon $C_8F_{16}O$ | 1.05 | 0.4 |

For these conditions (51), since $(A_1/A_2) << 1$, may be written to a good approximation:

$$1+(\Delta P_{123}/P_{s2}) = 1+\chi_i \quad (53)$$

for $M_2 < 0.1$ Mach (about 150 m/s for $H_2$ and $H_2/C_8F_{16}O$, $\Omega_a = 3.5$)

$$\mu(M_2) \approx \gamma_2^{\frac{1}{2}} M_2 \quad (54)$$

$$\chi_i = \{[\gamma_2(\Omega_2/\Omega_1)]^{\frac{1}{2}}[1/\mu(M_1)]\}(T_{s1}/T_{s2})^{\frac{1}{2}} \lambda M_2 \quad (55)$$

and finally the incremental pressure/pressure ratio is then:

$$\chi_i = \mu(T_{s1}/T_{s2})^{\frac{1}{2}} \lambda M_2 \quad (56)$$

EXAMPLE

Evaluate $\mu$ and find $\chi_i$ for a driver jet of 40% FC-78-60% $H_2$ fill gas for the specified conditions:

Given $\Omega_1 = 300$ for FC-78 fluorocarbon "Fluorinert"[20]

$\Omega_{2(ave)} = 3.5$ $\gamma_2 = 1.35$ $\mu(M_1) = 0.5$ with a fluorocarbon at $M_1 = 1.25$ $M_1 = 1.25$ Mach (driver jet Mach No.)

$T_{s1} = 600°$ K.

$T_{s2} = 400°$ K.

Answer $\mu = (1.35 \times 3.5/300)^{\frac{1}{2}}(1/0.5) = 0.235$ $\chi_i = 0.235 \times (600/400)^{\frac{1}{2}} \lambda M_2$ $$\chi_i = 0.288 \lambda M_2 \quad (57)$$

Referring to FIG. 8 the increase in pressure in the ejector $\Delta P_{123}$, is equal to the decrease in pressure $\Delta P_{34}$ due to electric power extraction, plus the decrease in pressure due to friction and other losses around the gas flywheel loop. Hence, $\Delta P_{123} = \Delta P_d$ the loop pressure decrement:

$$\Delta P_d = \Delta P_{34} + \Delta P_{L1} + \Delta P_{L2} \quad (58)$$

where $\Delta P_{L1}$ is the differential pressure decrease due to friction in the ejector, and $\Delta P_{L2}$ is the differential pressure decrease due to all other "lumped" losses.

$$\Delta P_{34} = \eta k_3/U_3 = p_e/U_3 \tag{59}$$

$$\Delta P_{L1} = \zeta_1 k_3/U_3 \tag{60}$$

$$\Delta P_{L2} = \zeta_2 k_3 (1-\eta)/U_4 \tag{61}$$

$$(U_4/U_3)^2 = 1-\eta; \quad U_4 = U_3(1-\eta)^{\frac{1}{2}} \tag{62}$$

From (61) and (62):

$$\Delta P_{L2} = \zeta_2 (p_{k3}/U_3)(1-\eta)^{\frac{1}{2}} \tag{63}$$

From (58), (59), (60), and (63), the pressure decrement around the loop is:

$$\Delta P_d = (p_e/\eta U_3)[\eta + \zeta_1 + \zeta_2(1-\eta)^{\frac{1}{2}}] \tag{64}$$

Substituting for $p_e$ and $U_3$ from (45) and (46):

$$(p_e/U_3) = (\tfrac{1}{2})(\epsilon_o b_1{}^2)\{\eta/\ln[1/(1-\eta)]\}\delta_a{}^2 \tag{65}$$

From (64) and (65):

$$\Delta P_d = k_5 \epsilon_5 \delta_a{}^2 [\eta + \zeta_1 + \zeta_2(1-\eta)^{\frac{1}{2}}]/\ln[1/(1-\eta)] \tag{66}$$

From (53) and (66):

$$\Delta P_d = \chi_d P_{s2} = \Lambda_1 k_5 \epsilon_5 \delta_a{}^2 \tag{67}$$

$$\chi_d = \Lambda_1 k_5 \epsilon_5 (\delta_a{}^2/P_{s2}) \tag{68}$$

$$P_{s2} = m_r \delta_1 \delta_a R_2 T_{s2} = (\Omega_2/\Omega_{aa})\delta_1(8315/\Omega_2)\delta_a T_{s2} = k_6 \delta_a T_{s2} \tag{69}$$

$$\chi_d = \Lambda_1 k_7 \epsilon_5 (\delta_a/T_{s2}) \tag{70}$$

From (46) and (68); the decremental pressure/pressure ratio is:

$$\chi_d = \Lambda_1 \tfrac{1}{2} [(\epsilon_o b_1{}^2/\delta_1)(b_g k_a)^2 \delta_a]/[(8315/\Omega_{aa})T_{s2}] \tag{71}$$

$$U_3{}^2 = (\epsilon_o b_1{}^2/\delta_1)[(b_g k_a)^2/m_r][\beta_1(\eta)]^2 \delta_a \tag{72}$$

From (71) and (72), noting the $m_r$'s at 2 and 3 are nearly equal:

$$\chi_d = \Lambda_1 \{\tfrac{1}{2} m_{r2} U_3{}^2/[\beta_1(\eta)]^2\}/(8315/\Omega_{aa})T_{s2} \tag{73}$$

Substituting for $\beta_1(\eta)$ and $\Lambda_2$:

$$\chi_d = \Lambda_2(\tfrac{1}{2}\gamma_2)(U_3{}^2/U_{s2}{}^2) \tag{74}$$

From (51), (54), and (55); the incremental pressure ratio is:

$$\chi_i = \lambda(\gamma_1 R_1 T_{s1}/\gamma_2 R_2 T_{s2})^{\frac{1}{2}} (\gamma_2/\gamma_1)^{\frac{1}{2}} [\gamma_2{}^{\frac{1}{2}} M_2/\mu(M_1)] \tag{75}$$

$$(1/\gamma_2)[\gamma_2(8315/\Omega_2)T_{s2}] = U_{s2}{}^2/\gamma_2 \tag{76}$$

$$\chi_d = \gamma_2 \{\Lambda_1/[\beta_1(\eta)]^2\}(\tfrac{1}{2}U_3{}^2/U_{s2}{}^2) \tag{77}$$

$$\chi_i = \lambda[\gamma_2/\mu(M_1)\gamma_1{}^{\frac{1}{2}}](U_{s1}/U_{s2}{}^2)U_2 \tag{78}$$

From (77) and (78), equating decremental and incremental ratios $\chi_d = \chi_i$:

$$(\gamma_2/2)(U_3{}^2/U_{s2}{}^2)\Lambda_2 = \lambda[\gamma_2/\mu(M_1)\gamma_1{}^{\frac{1}{2}}](U_{s1}/U_{s2}{}^2)U_2 \tag{79}$$

From (79); noting that:

$$M_1 = U_1/U_{s1} \tag{80}$$

$$(U_3/U_2)^2 = \lambda[2/\gamma_1{}^{\frac{1}{2}} \cdot \mu(M_1)](U_1/U_2)(1/\Lambda_2 M_1) \tag{81}$$

From (12) and (13); dividing through by A to obtain power densities:

$$p_{k2} = p_{k4} - p_{L2} \tag{82}$$

$$p_{k2} = (1-\eta)p_{k3} - \zeta_2(1-\eta)p_{k3} \tag{83}$$

$$p_{k2}/p_{k3} = (1-\zeta_2)(1-\eta) \tag{84}$$

$$(p_{k2}/p_{k3}) = (\tfrac{1}{2}\dot{m}_2 U_2{}^2)/[\tfrac{1}{2}(\dot{m}_1+\dot{m}_2)U_3{}^2] = [1/(\lambda+1)](U_2/U_3)^2 \tag{85}$$

Hence from (84) and (85), this simple form for $(U_2/U_3)^2$ is obtained:

$$(U_2/U_3)^2 = (\lambda+1)(1-\zeta_2)(1-\eta) \tag{86}$$

From (81) and (86), substituting for $(U_2/U_3)^2$:

$$[(\lambda+1)(1-\zeta_2)(1-\eta)]^{-1} = \lambda(2/\gamma_1{}^{\frac{1}{2}}\mu(M_1)(s_{12}/M_1\Lambda_2) \tag{87}$$

Define:

$$\Phi(M) \equiv \tfrac{1}{2}\gamma^{\frac{1}{2}}M \cdot \mu(M) \tag{88}$$

From (88) and the definition of $\mu(M)$:

$$\Phi(M) = \tfrac{1}{2}\gamma M^2[1+\tfrac{1}{2}(\gamma-1)M^2]^{\frac{1}{2}}/(1+\gamma M^2) \tag{89}$$

From (87) and (89):

$$\Phi(M) = s_{12}\lambda(\lambda+1)[(1-\zeta_2)(1-\eta)]/[\eta+\zeta_1+\zeta_2(1-\eta)^{\frac{1}{2}}] \tag{90}$$

Find M as a function of $\lambda$ for various constant values of the overall efficiency $\xi$ given constant values of the velocity ratio $s_{12}$, and the loop loss factor $\zeta_2$. In an operating gas flywheel, the velocities $U_1$, $U_2$ and $U_3$ are subject to these conditions:

$$U_1 > U_3 > U_2; \quad U_1/U_2 > U_3/U_2 > 1 \tag{91}$$

$$s_{12} > s_{32} > 1 \tag{92}$$

$s_{12}$ is taken as a small constant number $\geq 1$ for example $s_{12} = 1.1$ From (34), (86), and (92):

$$(\zeta_1/\lambda)^{\frac{1}{2}} > [(\lambda+1)(1''\zeta_2)(1-\eta)]^{-\frac{1}{2}} > 1 \tag{93}$$

(93), squaring and separating out the $\lambda$ terms:

$$K_3 = \zeta_1(1-\zeta_2)(1-\eta) \geq \lambda/(1+\lambda) \tag{94}$$

From (94) equating, and solving for $\lambda$:

$$\lambda = [K_3/(1-K_3)] < \zeta_1 \tag{95}$$

From (94) and (95), simplifying:

$$\zeta_1(1-\zeta_2)(1-\eta)/[1-\zeta_1(1-\zeta_2)(1-\eta)] < \zeta_1 \tag{96}$$

Solving dquation (16) for $\eta$:

$$\eta = (\zeta_1+\zeta_2)/[(1/\xi)-1+\eta_2] \tag{97}$$

which may be written as a linear function:

$$\eta = K_1\zeta_1 + K_2 \tag{98}$$

The lower bound $\zeta_1$ of (98) is obtained from (96) setting the inequality = 1, and solving for $\eta$; and setting the numerator = 0:

$$\eta = \zeta_1 - [\zeta_2/(1-\zeta_2)]/(\zeta_1+1) \qquad (99)$$

The lower bound is therefore the constant minimum value of $\zeta_1 = \underline{\zeta_1}$:

$$\underline{\zeta_1} \geq \zeta_2/(1-\zeta_2) \qquad (100)$$

The upper bound of equation (98) is obtained by setting $\eta = 1$, from which:

$$\overline{\zeta_1} = (1/\xi) - 1 \qquad (101)$$

The $\zeta_1$ ordinate in an $\eta$, $\zeta_1$ plot of (98) may be changed to a $\lambda$ ordinate:

$$\eta = (K_1 s_{12}{}^2)\lambda + K_2 = K_o\lambda + K_2 \qquad (102)$$

Figure 17:
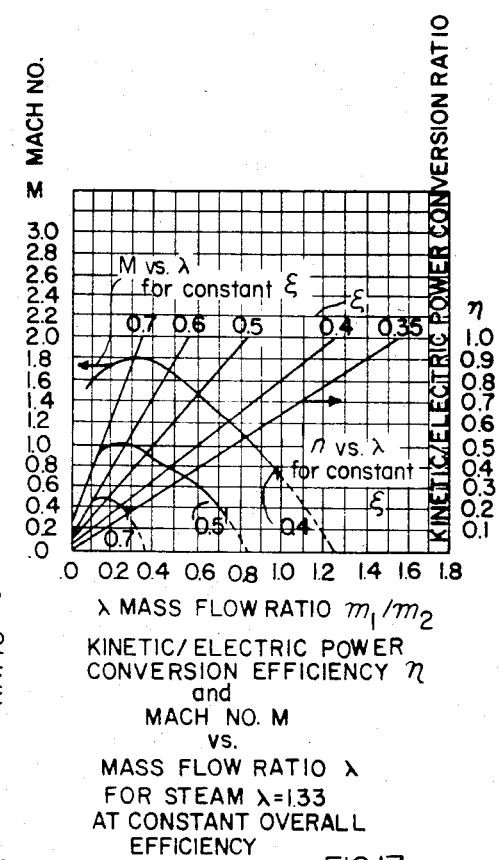
FIG. 17 shows Kinetic/electric power conversion efficiency $\eta$ and Mach Number M vs. Mass flow ratio $\lambda$ for steam $\gamma=1.33$ at constant overall efficiency $\xi$.
Figure 18:
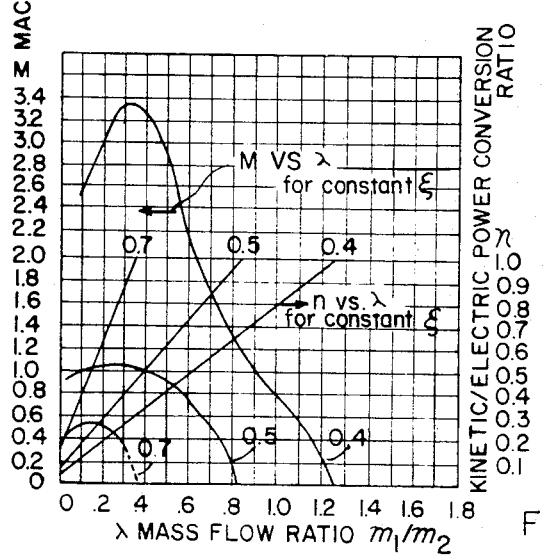
FIG. 18 shows kinetic/electric power conversion efficiency $\eta$ and Mach number M vs. mass flow ratio $\lambda$ for fluorocarbon vapor $\gamma=1.03$ at constant overall efficiency $\xi$.

Equation (102) is plotted in FIGS. 17 and 18 showing upper and lower bounds, for straight lines of constant overall efficiency.

In equation (102) for all values of $\xi$:

$$\begin{aligned}\eta &= 0 \\ \lambda &= -\zeta_2/s_{12}{}^2\end{aligned} \qquad (103)$$

This is a fictitious solution, but is useful in construction of the straight line $\eta$, $\lambda$ graphs which all pass through this point.

From (97) and (102) the upper bound for the mass flow ratio $\lambda$, $\overline{\lambda}$ is:

$$\overline{\lambda} = (1/s_{12}{}^2)[(1/\xi) - 1] \qquad (104)$$

and the lower bound for $\lambda$, $\underline{\lambda}$ is from (34) and (100):

$$\underline{\lambda} = \zeta_2/(1-\zeta_2)s_{12}{}^2 \qquad (105)$$

The independent variable in (91) is $\lambda$. $\zeta_2$ is constant, $\eta$ and $\zeta_1$ are functions of $\lambda$. Hence M is determined as a function of $\lambda$ between the upper and lower bounds $\overline{\lambda}$ and $\underline{\lambda}$ for various constant values of the overall efficiency $\xi$, for a small arbitrary constant value of $s_{12}$.

From (34), (102), and (103):

$$\Phi(M) = s_{12}(1-\zeta_2)\lambda(K_o\lambda+1)(1-K_o\lambda-K_2)/[-(1-K_o\lambda-K_2)+\lambda s_{12}{}^2+1+\zeta_2(1-K_o\lambda-K_2)^{\frac{1}{2}}] \qquad (106)$$

Using the substitutions:

$$(1-\eta) = K_o(\overline{\lambda}-\lambda) = K_o\overline{\lambda}(1-\Lambda) \qquad (107)$$

$$K_o\overline{\lambda} = [s_{12}{}^2/(1/\xi)-1+\zeta_2]\cdot[(1/s_{12}{}^2)(1/\xi-1)] = 1/[1+\xi\zeta_2/(1-\xi)] \qquad (108)$$

The equation (106) may be written:

$$\Phi(M) = s_{12}(1-\zeta_2)\lambda(1+\lambda(\overline{\lambda}-\lambda)/\{-(\overline{\lambda}-\lambda)+[(1+s_{12}{}^2\lambda)/K_o]+(\zeta_2/K_o)K_o{}^{\frac{1}{2}}(\overline{\lambda}-\lambda)^{\frac{1}{2}}\} \qquad (109)$$

and then with the substitution:

$$\Lambda \equiv \lambda/\overline{\lambda}; \ 0 < \Lambda < 1 \qquad (110)$$

there is obtained:

$$\Phi(M) = (1/s_{12})(1-\zeta_2)(1-\xi)\cdot(\overline{\lambda}+\Lambda)(1-\Lambda)/\{1+\xi\zeta_2\cdot 1+[1+\xi\zeta_2/(1-\xi)]^{-\frac{1}{2}}(1-\Lambda)^{\frac{1}{2}}/\Lambda\} \qquad (111)$$

Make these substitutions $\Phi_0$, $\Phi_1$, $\Phi_2$, $\Phi_3$ in (111): The resulting simplified equation is:

$$\Phi(M) = \Phi_0(\Phi_1+\Lambda)(1-\Lambda)/\{1+\Phi_2[1+\Phi_3(1-\Lambda)^{\frac{1}{2}}/\Lambda]\} = C \qquad (112)$$

Computation Procedure

For constant values of $\xi$ inert values of $\Phi_0$, $\Phi_1$, $\Phi_2$, and $\Phi_3$ into (112) and obtain values of $\Phi(M)$ vs. $\Lambda$ for intervals of $\Delta\Lambda = 0.1$ from 0 to 1. For each value of $\Phi(M)$ compute corresponding value of M by finding the 0 of the equation $$\Phi(M) - C = 0 \qquad (113)$$

Figure 16:
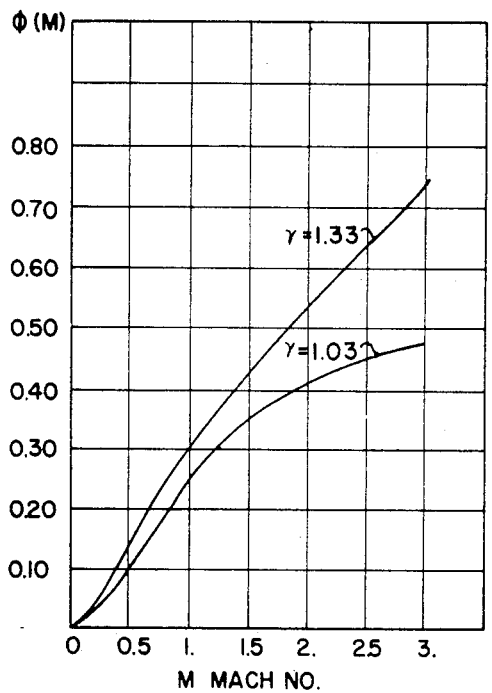
FIG. 16 shows the function $\Phi(M)$ vs. Mach Number M for steam $\gamma=1.33$ and fluorocarbon $\gamma=1.03$ vapors.

This may be done graphically by reference to the FIG. 16, which shows M vs. $\Phi(M)$ for $\gamma = 1.03$ and 1.33, fluorocarbon and steam vapors, respectively. Having $\overline{\lambda}$ from (104) compute M. vs. $\lambda$ for constant $\xi$. The results of these computations are shown in FIGS. 17 and 18, for constant $\xi = 0.4$, 0.5, 0.7, for $s_{12} = 1.1$ and $\zeta_2 = 0.07$; for steam and fluorocarbon vapors, respectively.

DISCUSSION

1. In FIG. 17, curves of M vs. $\lambda$, and $\eta$ vs. $\lambda$ are shown for constant values of $\xi = 0.35$, 0.4, 0.5, 0.6, and 0.7. The M vs. $\lambda$ curves shown peak values, and the range of $\lambda$ increases as $\xi$ decreases. The $\eta$ vs. $\lambda$ curves are straight lines for a constant value of the overall efficiency $\xi$.

2. Since the maximum kinetic/electric power conversion factor $\eta \approx 0.8$, and the minimum kinetic/electric power conversion factor $\eta \approx 0.1$, this limits the range of values of $\lambda$, at constant overall efficiency $\xi$. For example, from FIG. 17, for $\xi = 0.70$, the range is: $0.06 < \lambda < 0.3$. This range varies as $\xi$ varies.

3. Now referring to the curves of M vs. $\lambda$ in FIGS. 17 and 18:

3.1 The range of $\lambda$ varies with the value of the constant overall efficiency.

The range of $\lambda$ increases as the constant overall efficiency is decreased.

3.2. There is a maximum value of the Mach No. $\overline{M}$ at a particular value of the mass flow ratio $\lambda_1$. For example $\overline{M} = 0.42$ Mach at $\lambda_1 = 0.15$ for $\xi = 0.70$.

3.3 As the mass flow ratio $\lambda$ is decreased to less than the value of $\lambda_1$ at $\overline{M}$, the Mach No. M decreases. This is due to a simultaneous decrease in the factor $\eta$, which implies there is a greater proportion of kinetic power circulating in the loop, which increases friction power loss. Thus, the circulating gas velocity $U_2$ is also decreased at the ejector entrance plane 2; because the velocity $U_1$ of the jet decreases as $s_{12}$ is maintained constant.

3.4 As the mass flow ratio $\lambda$ becomes greater than the mass flow ratio $\lambda_1$ at maximum Mach No. $\overline{M}$, the Mach No. M again decreases, reaching 0 at $\lambda = \overline{\lambda}$. Simultaneously, as $\lambda$ increases, $\eta$ increases, which implies that the circulating kinetic power is decreased; and hence $U_2$ decreases; so, to keep $s_{12}$ constant, $U_1$ and M also decrease.

4. Comparing steam and fluorocarbon vapors, the curves for fluorocarbon vapor reach greater Mach Nos. particularly for $\xi < 0.50$. See FIGS. 17 and 18.

5. For an overall efficiency of $\xi = 0.70$ (70%) the peak Mach Nos. occur at $\lambda_1 = 0.15$; being 0.43 for steam, and 0.45 for fluorocarbon; for $\xi=0.50$ (50%); $M=1$ and 1.2 respectively at $\lambda_1=0.25$ and for $\xi=40\%$; $M=1.8$ and 3.3 at $\lambda=0.3$, respectively.

6. A large overall efficiency, for example $\xi=0.7$, as obtainable only at subsonic Mach No., and over a small range of $\lambda$. This implies the use of jets with a small temperature decrease. To obtain a large total efficiency, multistaging must be used with many stages[12,21].

7. With supersonic Mach Nos., the overall efficiency is decreased. However, the jet has a larger temperature drop and hence fewer stages are needed.

JET VELOCITY AND MOLECULAR WEIGHT

The sonic velocity of a jet is related to its molecular weight $\Omega$, the absolute stagnation temperature of the gas (°K.); and the ratio of specific heats, $\gamma$:

$$U_{s1} = (8315\gamma T_{s1}/\Omega)^{\frac{1}{2}} \tag{114}$$

An efficient thermal cycle requires a maximum vapor entrance temperature $T_{s1}$ and a minimum exit temperature $T_{s2}$. The jet velocity $U_1$ is given by:

$$U_1 = M_1 U_{s1} = M_1[\gamma_1(8315/\Omega_1)T_{s1}]^{\frac{1}{2}} \tag{115}$$

EXAMPLE

Given

1. A fluorocarbon FC-75 $C_8F_{16}O$; $\Omega_1=416$ molecular weight of vapor.
2. FC-70 $\Omega_2=820$ molecular weight of vapor $\gamma_1=\gamma_2=1.03$ $T_{s1}=T_{s2}=900°$ K.

Find

1. $U_{s1}$ for 1.
2. $U_{s2}$ for 2.

Answers

1. From (114):

$$U_{s1} = [1.03\times(8315/416)900]^{\frac{1}{2}} = 136 \text{ m/s}$$

2.

$$U_{s1} = [1.03(8315/820)900]^{\frac{1}{2}} = 97 \text{ m/s}$$

Overall Efficiency

The overall efficiency of $\xi$ of the ETD generator (excluding the thermal cycle) may be computed from $\zeta_1$, $\zeta_2$ and $\eta$ using Equation (16).

FIG. 11 shows overall efficiency $\xi$ vs. electric kinetic conversion ratio $\eta$ for an ejector loss coefficient $\zeta_2=0.1$. For example, if $\eta=0.3$ is constant, the overall efficiency varies from 73% to 26% for a variation of the lumped loss coefficient $\zeta_2$ from 0.01 to 1, respectively.

The lumped loss coefficient $\zeta_2$ is the only system parameter not well characterized. Prior work assumed a friction loss factor $f=0.01$ to 0.03. Other factors such as turning loss and exhaust loss must be included and determined experimentally. A new friction loss formula based on a compressible fluid flow analysis indicates a smaller friction loss factor.

For $\zeta_1=0.10$, the ejector efficiency $\xi_1$ is:

$$\xi_1 = 1/(1+\eta_1) = 1/1.1 \approx 0.91.$$

Thus for $\zeta_1=0.10$; $\eta=0.3$, there is obtained $\xi=0.67$ (67%) for lumped loss coefficient $\zeta_2=0.07$.

This favorable result occurs because the residual circulating kinetic power $P_{k2}$ adds to the jet power $P_{k1}$ at the conversion entrance plane 1, 2.

Velocity Ratio $U_1/U_2 = s_{12}$

Mass Flow Ratio $\lambda$

The velocity ratio $s_{12}=U_1/U_2$ the ejector entrance must be small.

$s_{12}$ together with $\zeta_1$ immediately specifies the mass flow $\lambda=m_1/m_2$.

Using equation (33), for example $\zeta_1=0.10$ $\xi_1=1/1.1=0.91$ (91%) and (34):

$$\lambda = \zeta_1/s_{12}^2 = 0.10/1.2^2 = 0.07$$

Velocity Ratio $U_3/U_2 = s_{32}$

The velocity ratio $s_{32}$ is calculated from equation (86):

$$s_{32} = [(\lambda+1)(1-\zeta_2)(1-\eta)]^{-\frac{1}{2}} \tag{116}$$

EXAMPLE

Given $\lambda=0.17$
$\zeta_2=0.07$
$\eta=0.3$

Find $s_{32}$

From (116):

$$s_{32} = [(1.07)(0.93)(0.70)]^{-\frac{1}{2}} = 1.2 \tag{117}$$

The ETD converter velocity $U_3$ and relative density $\delta_a$

Given these conditions:
$\eta=0.10$
$p_e=0.38\times 10^6$ watts/m² 38 watts/cm²
$b_g=2$ From FIG. 14, the converter entrance gas velocity $U_3$ and density $\delta_a$ is found:
$\delta_a=3.2$
$U_3=260$ m/s Relationship of the velocity ratios $s_{12}$ and $s_{32}$
To drive the ejector $U_1$ must exceed $U_3$:

$$U_2 = U_3/s_{32} = 260/1.2 = 217 \text{ m/s}$$

$$U_1 = s_{12}U_2 = 1.2\times 217 \text{ m/s} = 260 \text{ m/s}$$

The value of $\Phi(M)$ is then calculated using the above values of $\eta$, $\zeta_1$, $\zeta_2$, $\lambda$, and $s_{12}$

EXAMPLE $\zeta_1=0.25$
$\zeta_2=0.07$
$\eta=0.25$
$\lambda=0.174$
$s_{12}=1.2$
$T_{s1}=600°$ K.

From (91) and FIG. 16:

$$\Phi(M) = s_{12}\lambda(1+\lambda)(1-\eta_2)(1-\eta)/[\eta+\zeta_1+\zeta_2(1-r)^{\frac{1}{2}}]$$

$$= 1.2 \times 0.074 \times 1.07 \times 1.25 = 0.305$$

From FIG. 16 for $\Phi(M_1)=0.305$; $M=1.25$; hence $U_{s1}=U_1/M_1=194/1.25=155$ m/s.

From (16), the overall efficiency $\xi$ is $\xi = 1/\{1 + 0.07[(1-0.25)/0.25] + 0.25/0.25\} = 45.2\%$ The molecular weight $\Omega_1$ is found from (114):
$\Omega_1 = 8315 \gamma_1 T_{s1}/U_{s1}^2$
$\Omega_1 = 8315 \times 1.03 \times 600/155^2 = 214$ In this example a substance whose vapor has a molecular weight $\Omega_1 = 214$ is chosen.

A fluorocarbon, such as FC 78 which has a molecular weight of 300 could be used to provide an approximate match. It has a boiling point of 50° C.

To obtain a closer match it is preferred to use a suitable fluoro-hydrocarbon of fluoro-alcohol (for its electron-attaching ability) such as $C_nH_{2n}C_mF_{2m}OH$, or other suitable vapor.

This is only a single example, and is not an optimized result, and is not to be considered a limitation.

CONCLUSIONS ON METHOD II (1) With only a single stage and subsonic driver jet, this analysis shows that the overall efficiency will not exceed about 70%.

(2) With multistaging and with a thermal efficiency of 32%, total efficiency will not exceed about 25%.

These total efficiency values are comparable with Rankine Cycle heat/rotating electromagnetic electric generators and will provide simpler, less expensive devices.

The method II analysis assumes that the kinetic power of the jet is transferred to the carrier gas in the ejector and that thereafter, power conversion occurs in the conversion region.

The calculations are based on these separate actions. However, if the actions were to take place simultaneously in whole or in part, an increased overall efficiency will result. In the configuration shown in FIGS. 1 to 7 inclusive, the formation of the charged aerosol begins in the ejector region. Here, a supersonic jet expands conically, not only because of the usual conical expansion of a supersonic jet, but also because of mixing and diffusion effects occurring at the jet boundaries with the carrier gas as well as the mutual repulsion of the charged droplets in a radial electric field. Moreover, the charged droplets form downstream of the emitter points 15. Thus, power conversion begins in the ejector region and continues into the conversion region. Thus, the actions are a combination of Methods II and III. Method III is described in the following section. The mathematical physics theory given herein for Methods II and III are abstractions based upon the assumption of pure Method II or pure Method III occurrences. Experimentally, Method III can physically occur alone and without mixture with a Method II process, as will be evident from the following description.

METHOD III—INTRODUCTION

In the conventional prior art analysis (U.S. Pat. No. 2,638,555) using a contact thermodynamic state $n = -2$, and $\rho_z = \rho_a$ a constant. When $n=0$ the velocity is constant and no power conversion occurs. However, according to this invention, it was discovered that when $0 > n > -2$, new field properties exist, that enable greater current, decreased voltage and increased power conversion. The electric breakdown field is greatly decreased at the entrance to the conversion space, which enables all of the jet kinetic power to be converted to electric power within the expanding jet.

Figure 20:
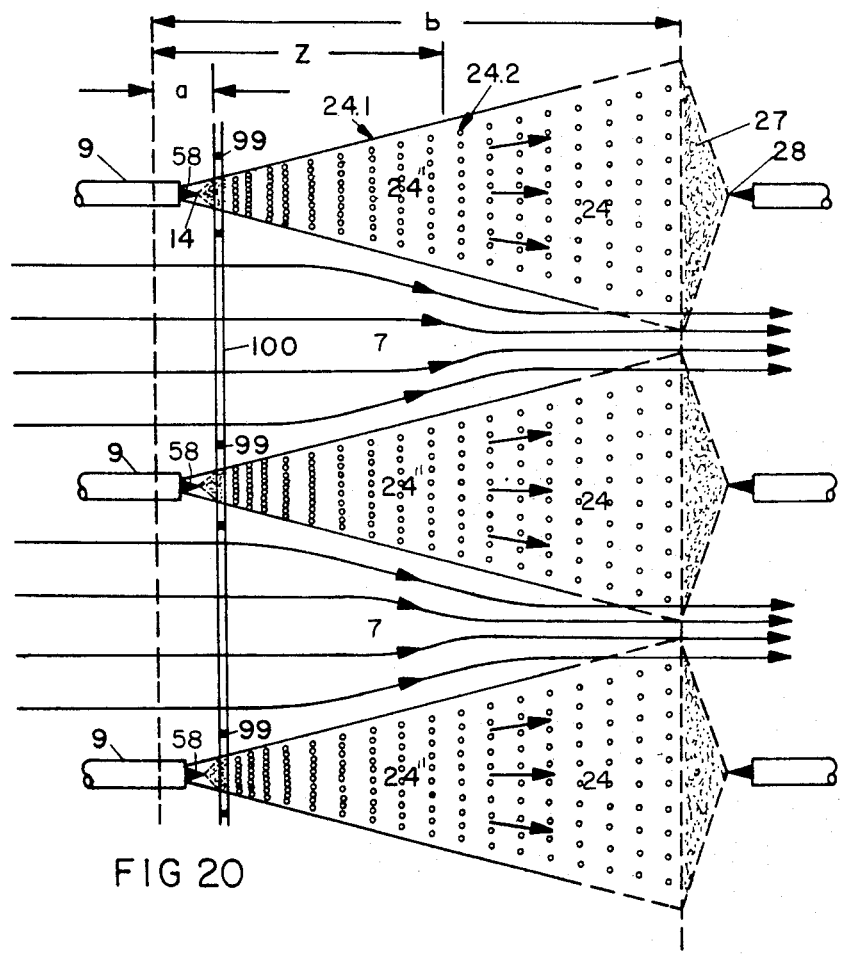
FIG. 20 is an ETD Generator with supersonic subsonic jet array using the Separated Flow Method III.

In FIG. 20, there is shown a plurality of emitter tubes 9 in which there are orifices 58 and emitter points 14. Supersonic jets 24 issue from the orifices 58 and form supersonic streams of a diverging/converging shape. An electric field is applied between an emitter point 14 and the exciter electrode 99. A subsonic gas flow passes between the supersonic jets 24 at 7, where the subsonic gas flow converges and is accelerated. It eventually mixes at 24" with the expanded cones 24-1 of charged droplets 24-2. The charged droplets form an expanding cone because of:

1. Mutual repulsion
2. Diffusion
3. The diverging field between the emitter 14 and the exciter 99.
4. Turbulence Between the emitter 14 and the exciter 99 there is no electric power generated.

Figure 21:
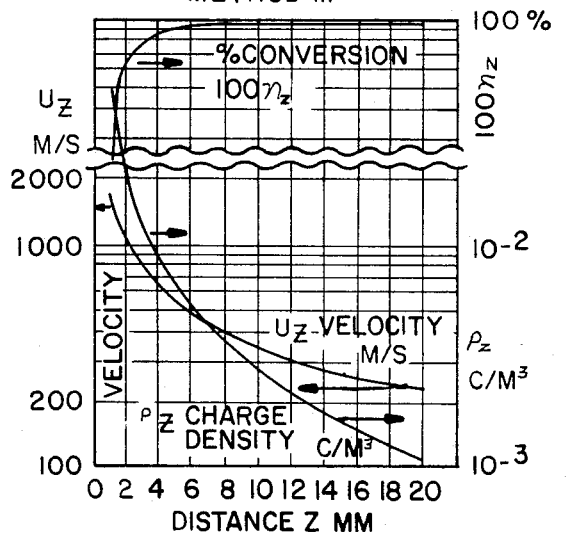
FIG. 21 shows for Method III the proportion of kinetic power converted to electric power vs. distance; and charge density and jet velocity vs. distance.

Referring to FIG. 21, there is shown, on a semi-log scale, % kinetic/electric conversion efficiency $\eta$, velocity U, and charge density $\rho$, on a log scale, plotted against a linear scale for z in mm. The subscript z refers to the value of the variable at distance z.

In FIG. 20, the entrance to the cone is at distance $z = a$, and the exit of the cone is at the collector 28. The velocity U between a and b is decreased because of extraction of electric power within the cone. At $z = b$, the mixing of the jet with the subsonic flow is substantially complete. Between a and b the voltage increases very little because the charge density is decreasing rapidly. Between a and b the decrease in velocity is substantially due only to the electric power conversion. There are no physical walls between the jets. If walls were present between the conversion sections, frictional power losses would be considerable. As the relative gas densities increase, the kinetic/electric power conversion length $L = b - a$ between a and b is inversely proportional to the gas density. In the device shown in FIGS. 19 and 20 herewith, the dimension L may be decreased to less than 1 mm, with no friction losses due to wall surfaces.

The charged droplets disrupt the boundary layers of the conical jet and facilitate the mixing between the supersonic and subsonic gas streams.

Figure 19:
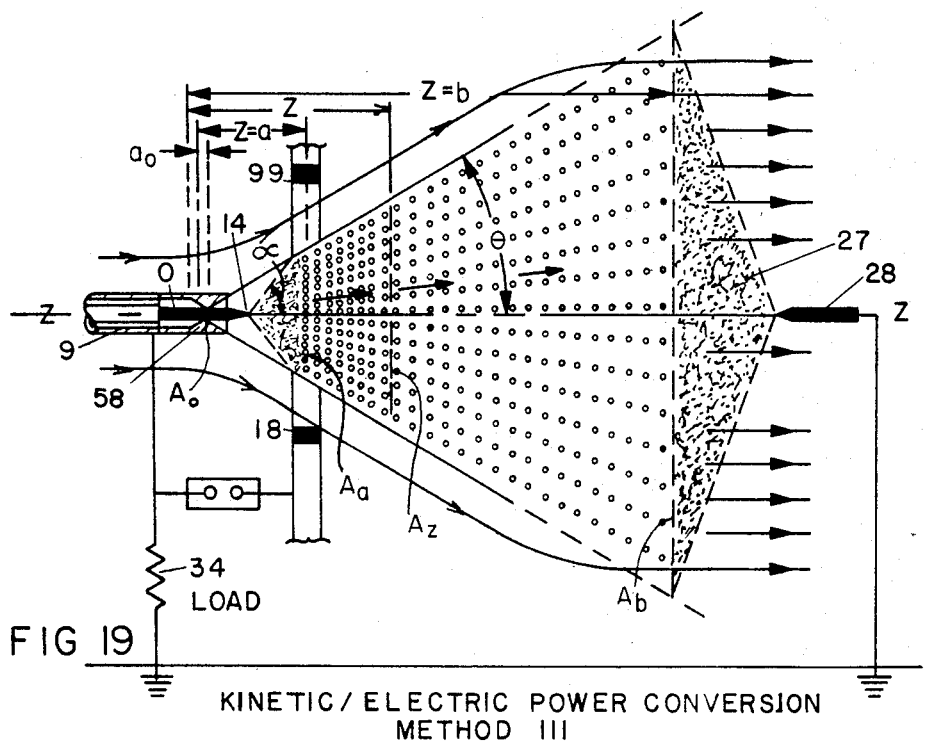
FIG. 19 shows the separated flow Method III ETD kinetic/electric power conversion with a supersonic jet.

The array shown in FIG. 20 herewith is located within the TORON. In FIG. 19, the collector 28 is grounded to the body of the TORON. The low velocity vapor stream travels around the loop of the TORON, is partially condensed at the condenser, and the residual vapor is returned to the entrance of the conversion space.

Electric/Kinetic Power Conversion Ratio for Method III

THE GENERAL CASE

In the Separated Flow Method III, shown in FIGS. 19-24 inclusive, efficient direct ETD conversion of the kinetic power of a jet is effected.

Referring to FIG. 19, a supersonic steam jet issues from an orifice at a distance $z = a_o$ and area $A_o$, with boundary angle $\theta$ to the axis Oz and an initial velocity $U_a$. An electric field is established between a point and an exciter electrode. The point emits electrons within the vapor which is cooling and condensing; thus forming charged droplets at a distance $z = a$ and area $A_a$ within the expanding jet cone. The jet expands conically from a small area $A_o$ at the orifice to a much greater area $A_a$ at a distance $z=a$ along the cone axis. This increase in area may be, for example, 100 times from $z=a_o$ at the orifice, to $z=a$ in the cone; where the ions are introduced at area $A_a$ to form charged condensation nuclei. Single charged water droplets grow on these nuclei to form a charged aerosol suitable for power transduction. This spreads the current over a larger area; $A_o/A_a$. Also see FIG. 6.

In the expanding cone, the area increases, the jet velocity decreases, and the charge density decreases with z; enabling a larger current to be supported without electric breakdown, the generated voltage is decreased, the conversion section is longer, and the power output increases.

The cross section at area $A_z$ of the cone varies with the distance z:

$$A_z=A_a(z/a)^2 \quad (118)$$

Because of the ETD conversion of kinetic to electric power, the velocity decreases with z/a according to:

$$U_z=U_a(z/a)^n \quad (119)$$

where $0>n>-2$; for example, $n=-1$.
Hence, the charge density $\rho_z$ at z is:

$$\rho_z=I/U_zA_z=I/U_a(z/a)^n\cdot A_a(z/a)^2=(I/U_a/A_a)(z/a)^{-(n+2)} \quad (120)$$

$$\rho_z=\rho_a^{(z/a)-(n+2)} \quad (121)$$

A charged aerosol is formed at the plane z=a. The charge density of the charged aerosol decreases exponentially and power conversion occurs within the cone from z=a up to the discharge plane x=b. The following is a one-dimensional analysis which is a first approximation:

$$\partial^2V/\partial z^2=-(\rho_1/\epsilon_o)(z/a)^m=-(\rho_1/\epsilon_o)a^{-m}z^m \quad (122)$$

Integrating (122):

$$E=\partial V/\partial z=-(\rho_1/\epsilon_o)a^{-m}[1/(m+1)](z^{m+1}+C_1) \quad (123)$$

$$\left.\begin{array}{l} E=0 \\ z=b \\ C_1=b^{m+1} \end{array}\right\} \quad (124)$$

$$\partial V/\partial z=E=k_1'(z^{m+1}-b^{m+1}) \quad (125)$$

Integrating again (125) becomes $$V=k_1'\{[1/(m+2)]z^{m+2}-b^{m+1}z+C_2\} \quad (126)$$

$$\left.\begin{array}{l} V=0 \\ z=a \\ C_2=-[1/(m+2)]a^{m+2}+b^{m+1}a \end{array}\right\} \quad (127)$$

$$V=k_1'a^{m+2}[\{1/(m+2)\}(z/a^{m+2}-(b/a)^{m+1}(z/a)-\{1/(m+2)\}+(b/a)^{m+1}] \quad (128)$$

$$\left.\begin{array}{l} V=\overline{V} \\ z=b \\ \overline{V}=k_1'a^{m+2}[1/(m+2)][-(m+1)(b/a)^{m+2}+(m+2)(b/a)^{m+1}-1] \end{array}\right\} \quad (129)$$

Evaluating the constant term in (129):

$$k_1'a^{m+2}[1/(m+2)]=(-[\rho_1L^2/2\epsilon_o]\{2/[(b/a)-1]^2\}[1/(m+1)(m+2)] \quad (130)$$

$$V_c=\rho_1L^2/2\epsilon_o \text{ since } m=0 \text{ for constant charge density}^{7.1} \quad (131)$$

Hence, the voltage ratio $\chi_m=\overline{V}/\overline{V}_c$ is:

$$\chi_m=[2/(m+1)(m+2)]\{1/[(b/a)-1]^2\}[(m+1)(b/a)^{m+2}-(m+2)(b/a)^{m+1}+1] \quad (132)$$

$$\text{Let } b/a=x;\ m+1=y;\ m=y-1;\ m+2=y+1 \quad (133)$$

then $$\chi_m=[2/y(y+1)][1/(x-1)^2][yx^{y+1}-(y+1)x^y+1] \quad (134)$$

Evaluation of the current ratio $\zeta_m^{-1}$
From (125):

$$E=k_1'(z^{m+1}-b^{m+1}) \quad (135)$$

$$E=\bar{\bar{E}};\ z=a \quad (136)$$

$$E=k_1'(a^{m+1}-b^{m+1})=k_1'a^{m+1}[1-(b/a)^{m+1}] \quad (137)$$

Evaluating the constant term[7.1] in (137):

$$-\rho_1L/\epsilon_o\{1/[(b/a)-1](m+1)a^{m+1}\}\cdot a^{m+1}=-E_c\{1/[(b/a)-1](m+1)\} \quad (138)$$

Hence the Electric Field Intensity Ratio $\zeta_m$ is:

$$\zeta_m\equiv\bar{\bar{E}}/\bar{\bar{E}}_c=\{1/(m+1)[(b/a)-1]\}[(b/a)^{m+1}-1] \quad (139)$$

The effect of the decreasing charge density is to cause the electric field intensity to decrease by the factor $\zeta_m$. The electric field intensity is proportional to the current density. To bring the electric field intensity back to the breakdown electric field, the current density must therefore be increased inversely with $\zeta_m$ and accordingly the current ratio is $\zeta_m^{-1}$;

$$\zeta_m^{-1}=(m+1)[(b/a)-1]/[(b/a)^{m+1}-1] \quad (140)$$

Power Ratio $\Gamma_m$

The maximum power ratio $\Gamma_m$ is proportional to the maximum current ratio $\zeta_m^{-1}$ times the maximum voltage ratio $\zeta_m^{-1}\cdot\chi_m$. The maximum voltage ratio includes the inverse current ratio term because increasing the current density also increases the output voltage. As shown in FIG. 22, the voltage ratio $\chi_m$ is decreased by the decreasing charge density. However, when the current density is increased to the breakdown strength at the entrance plane, this also has the effect of increasing the output voltage so that the resultant voltage ratio is now $\chi_m^{-1} \cdot \chi_m$. Consequently, the power ratio is:

$$\Gamma_m = \zeta_m^{-2} \cdot \chi_M \tag{141}$$

From (132), (133), and (140):

$$\Gamma_m = \{(m+1)^2[(b/a)-1]^2/[(b/a)^{m+1}-1]^2\}\{[2/(m+1)(m+2)][1/(b/a)-1]^2[(m+2)(-b/a)^{m+1}-(m+1)(b/a)^{m+2}-1]\} \tag{142}$$

Simplifying and expressing (142) in terms of x and y, the Power Ratio is:

$$\Gamma_m = 2\{y/(y+1)[yx^{y+1}-(y+1)x^y+1]\}/[x^y-1]^2 \tag{143}$$

Figure 22:
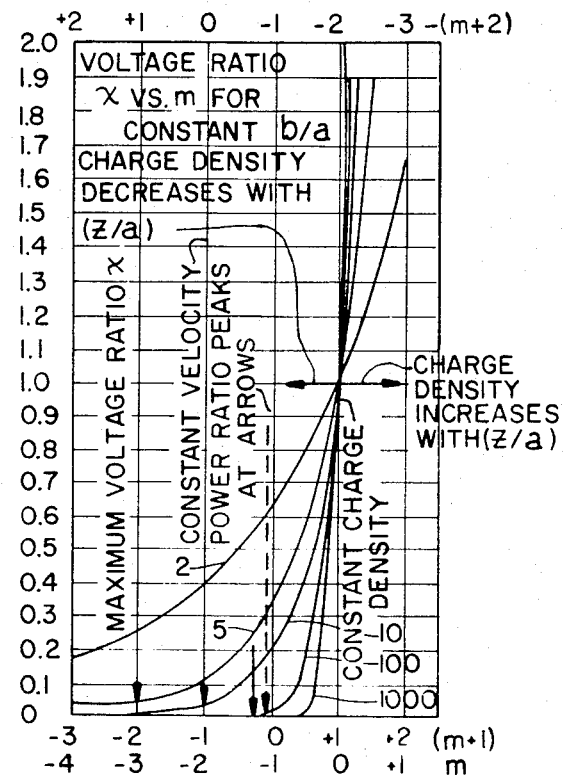
Figure 23:
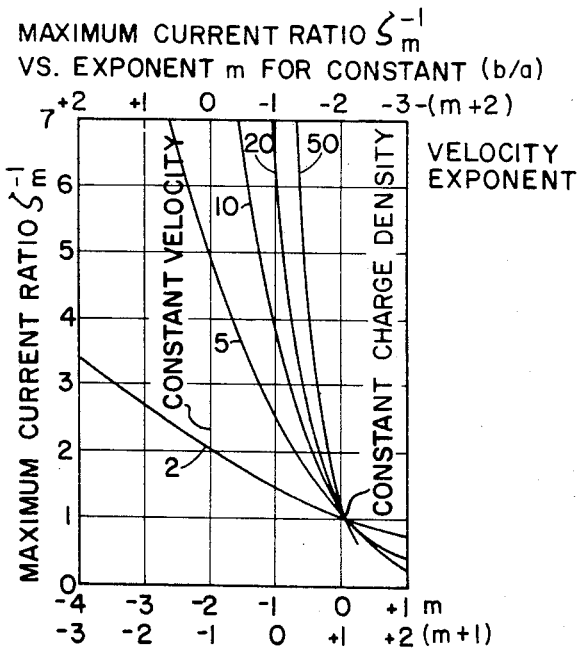

The maximum current ratio $\zeta_m^{-1}$ vs. m for constant values of b/a is graphed in FIG. 23.
The voltage ratio $\chi_m$ vs. m for constant values of b/a is shown in FIG. 22.
The power ratio $\Gamma_m$ vs. m for constant values of b/a is graphed and shown in FIG. 24.
The jet kinetic power issuing from an orifice is:

$$P_k = \tfrac{1}{2} m_r \delta_1 \delta_a U_1^3 A_o \tag{144}$$

In the expanding cone the power conversion is, from (1), (143) and FIG. 24:

$$P_e = \tfrac{1}{2} \epsilon_o (b_1 b_g \delta_a)^2 U \, A_a \Gamma_m \tag{145}$$

where $\Gamma_m$ is the power ratio compared to the constant charge density case. From (144) and (145) compared with Method I equation (4), this remarkable equation is obtained from Method III:

$$\eta = (\epsilon_o b_1^2/\delta_1)[(b_g k_a)^2/m_r](\delta_a/U_1^2)(A_a/A_o)\Gamma_m \tag{146}$$

EXAMPLE

Given $\eta = 0.8$ $P_k = 125$ watts $U = 1800$ m/s

Find $A_o, \dot{m}_1, D_o, \delta_a$

Answer $$P_k = \tfrac{1}{2} \dot{m}_1 U^2 = 125 \tag{147}$$

$$\dot{m}_1 = 125 \times 2/(1800)^2 = 7.716 \times 10^{-5} \text{ kg/s} \tag{148}$$

$$\dot{m}_1 = A_o \cdot m_r \delta_1 \delta_a \cdot U_1 \tag{149}$$

$$A_o = \dot{m}_1/m_r \delta_1 \delta_a U_1 \tag{150}$$

$$\delta_a A_o = 7.716 \times 10^{-6}/0.625 \times 1.177 \times 1800 \tag{151}$$

$$\delta_a A_o = 5.83 \times 10^{-8} \tag{152}$$

$$D_o = [(4/\pi)5.83 \times 10^{-8}/\delta]^{\tfrac{1}{2}} \tag{153}$$

$$D_o = 272 \text{ } \mu\text{m}/\delta^{\tfrac{1}{2}} \tag{154}$$

$$(b_g k_a)^2 \delta_a D_a/D_o)^2 \Gamma_m = 0.8/3.34 \times 10^{-5} = 2.4 \times 10^4$$

for $b/a = 10; m = -1; \Gamma_m = 5; (b_g k_a) = 1.4$ $\delta_a (D_a/D_o)^2 \approx 4800$ and from (154):

$$\delta_a^{3/2}(D_a/0.272)^2 = 4800 \tag{155}$$

If $D_a = 2.72$ mm $\delta_a^{3/2} = 50$ $$\delta_a = 13.5 \tag{156}$$

$$\delta_a(D_a/D_o)^2 = 1200 \text{ using a hydrogen/fluorocarbon fill gas } b_g = 2 \tag{157}$$

$$\delta_a^{3/2} = 12.0 \tag{158}$$

$$\delta_a = 5.2 \tag{159}$$

METHOD III-DISCUSSION

FIG. 21 shows a graph of kinetic/electric power conversion ratio 4 vs. distance z is mm for $m = -0.7$; and velocity and charge density vs. distance z is mm. Most of the jet kinetic power is converted to electric power from z=0 to 6 mm. The boundary wall between the jet and fill gas disappears as the jet decreases to less than sonic velocity (about 500 m/s), whereupon the jet and fill gas mix substantially without frictional power loss.

The expanding jet, confined between its boundary layers, comprises an "ETD converter without walls". An array of these jets, shown in FIGS. 20 and 31 enables "broad channel" power conversion with substantially no wall friction loss. Substantially all of the jet kinetic power is converted to electric power and the small residual power provides the circulation of the fill gas.

Some fluorocarbon from the fill gas diffuses into the jet and increases its electric breakdown strength. The area ratio $A_a/A_o = 100$; $\Gamma_m = 2.5$ for b/a=10; and $(b_g k_a)^2 = 2^2 = 4$ using $\delta_a = 6$, $\delta_a^2 = 36$; a power conversion factor of $3.6 \times 10^4$ is obtained; which provides more than the breakeven ratio $\eta = (p_e/p_k)$, according to (146).

In previous work the charge density was chosen as constant. The generator designs based upon the constant charge density case resulted in relatively large voltages, low currents and substantial values for power density only at relative densities of 10 or more.

The solution to the General Case in which charge density varies with distance according to $(z/a)^m$, includes the voltage ratio, current ratio, and power ratio curves shown in FIGS. 21-24 inclusive. These ratios are taken with respect to the constant charge density case as unity. The solution for special case where $m = -1$ is logarithmic, but the values form a continuum with the General Case. Large currents, small voltages and a peak in the power curve are new and unexpected and are advantageous for improved designs of the ETD Generator.

In FIG. 22, the corresponding values for the voltage ratio for b/a=5, 10, 100, 1000 are respectively 0.15, 0.08, 0.01, and 0.002.

FIG. 23 shows for constant charge density the maximum current ratio $\zeta_m^{-1}=1$. As the charge density decreases with the distance along the conversion space the current ratio increases very rapidly. A decrease of the charge density with distance along the conversion space, according to the exponent $m=-1$, for distance ratios $b/a=5$, 10, 100, 1000, results respectively in 2.5, 3.9, 21, and 144, as the current ratio, compared to the case where the charge density is constant, with distance.

In FIG. 24, the power ratio curves also show a very unexpected and favorable result. Peaks in the power ratio curves are obtained; for the b/a ratios 10, 100, and 1000, the peaks are respectively at exponents $-1$, $-0.22$, and $-0.15$, for which the power ratios are 3, 11, and 44.5 respectively.

It appears that with a long conical jet comprising a charged aerosol in which the charge density decreases exponentially with distance that large currents can be obtained with little voltage buildup.

As electric power is drawn, the velocity along the jet is decreased. Thus, the charge density decrease with distance may be adjusted to obtain a peak output power ratio.

This current can be delivered to a larger cross sectional area from a small current source over a substantial distance; that is, about 1-10 cm without a large buildup in voltage. This will enable designs having practical dimensions which can be readily fabricated.

Further, more power can be extracted than was otherwise available at a given gas density using a decreasing instead of a constant charge density.

Method III opens new vistas for the future of ETD. The mathematical physics analysis is a first approximation based upon a one-dimensional analysis, which has yielded remarkable results. More accurate formulae may be derived taking into consideration the divergence of the flux in the cone, using the electrodynamic equations of the motion of a charged aerosol of zero mobility. The presence of shock boundary layers and regions with different velocity and pressure values must be considered. However, it is expected that these more detailed analyses will substantially confirm the results obtained herein with some modifying terms.

Supercritical Rankine Cycle ETD Generator Using Method III

In practice the only high pressure components will be the pump, boiler, and superheater which can be made very compact and reinforced to be safe at 10,200 psia. The size will be small because a 10 kW unit will require less than 7 ml/sec (a little less than 0.1 gpm); and the generator unit itself will operate at less than 152° C. and at the small pressure of only 73 psia (about 5 atmos) which requires a light-weight construction. It operates on steam only, with possible only some fluorocarbon in the hydrogen fill gas to increase the electric breakdown strength. At the small temperature of the ETD Generator, the fluorocarbon will be stable.

For a supercritical cycle, using Method III, the thermal efficiency of a single stage is about 40%; the overall (loop) kinetic/electric conversion is 80% and the total heat/electric power efficiency is about 30%.

The Marks-Ericsson ETD Generator, using Method IV

In this method a liquid metal is injected from an orifice under pressure into the single loop cycle where it is dispersed into an inert gas stream. For example, the metal may be at about 1800° K., imparting both thermal energy and momentum to the gas. The jets break up into droplets and become charged by capacitive inductance, the so-called "electrojet method". These charged droplets are the current carrier. The heat/kinetic power of the working material, the charged liquid droplets in the gas stream, is converted into electric power in an ETD Generator. The pressure and temperature decrease from their initial values at the orifice. The conditions are such that there is: (1) thermal contact between gas and the liquid metal droplets and (2) that the heat content of the liquid metal droplets far exceeds that of the gas; hence the ETD conversion will be almost isothermal. The hot gas proceeds through a heat regenerator giving most of its heat energy to the return stream. Pumping occurs in an ETD compressor stage, converting a small proportion of the generated electric power into heat-mechanical power, preferably using water to form the charged droplets at ambient temperature, about 300° K. Here, as in the ETD generator, the process is assumed to be almost isothermal. There will actually be a small increase in pressure and temperature. The gas then returns to the ETD generator, having absorbed heat from the opposing gas stream passing through the regenerator. A heat exchanger, which uses water as a coolant, fixes the temperature of the ETD compressor at about 300° K.

Comparison of Methods II, III, and IV

The comparison of Methods II, III, and IV in Table 3 favors Methods III and IV.

TABLE NO. 3

COMPARISON OF METHODS II, III, AND IV

| | Method II | Method III | Method IV |
|---|---|---|---|
| Working Fluid | Material with molecular wt 200–800 | water | water liquid metal |
| Cycle | Rankine | super-critical Rankine | Ericsson |
| Maximum temperature | 900° K. | 1275° K. | 1800° K. |
| Stability at temperatures > 600° K. | Fluorocarbon is unstable to some degree may be usable | stable | stable |
| Thermal efficiency of Cycle | 32% | 40% | 75%* |
| Total Heat/Electric power Efficiency | 25% | 32% | 60%** |
| Theoretical Understanding | Excellent | Fair | Excellent |
| Experimental work | Fair in related fields | None | Some in related fields |

NOTE:
*For Method IV the theoretical thermal efficiency of the cycle is 83%; with 90% for regenerator, this becomes 75%.
**If the overall efficiency is 80%, the total efficiency is then .75 × .80 = 0.60; 60%.

Supercritical Single Stage ETD Generator Using Method III

The Method III ETD Heat/Electric Power Converter is readily incorporated in a remarkably simple efficient single stage supercritical Rankine cycle, shown in FIG. 25. The thermal efficiency is estimated at about 45%.

Thermodynamic Data[22]

(1) The maximum temperature is 1000° C.-1273° K.
Pressure p=70 MPa 10, 152 psia
Vapor Density $\delta=123.3$ kg/m$^3$
Enthalpy h=4449.8 kJ/kg Specific Entropy s = 6.823 kJ/(kg, °K.)

(2) The minimum temperature is 152° C.–425° K. dry, 400° K. wet
Pressure 0.5019 MPa, 73 psia
Saturated vapor density, 2.677 kg/m³
Vapor enthalpy = 2748.9 kJ/kg or 2.7489×10⁶ J/kg
Specific Entropy = 6.820 kJ/(kg, °K.)

Efficiency

From FIG. 25, noting that the area ABC under the Temperature T-Entropy s curve T=f(s) may be approximated by the area of the triangle ABC, which is the same as the rectangular area AFGC in which segments BG=GC, bisect the triangle at 750° K. The cycle extends into the wet region C'A'.

From this the thermal cycle efficiency is approximately:

$$\xi_{TH} \approx 750 - 400/750 = 46.6\% \qquad (160)$$

An actual integration will incorporate about the same area in the curve under T=f(s) including the wet region C'A' which will yield an estimated efficiency of about 45% (less 5% pump work) ≈ 40% net.

Jet Kinetic Power $$P_{k1} = \tfrac{1}{2}\dot{m}U^2 = \dot{m}\Delta h \qquad (161)$$

EXAMPLE

The vapor expands isentropically at a specific entropy of 6.82 kJ/kg °K. from 1273° K. to 425° K.

$$\Delta h = 4.4498 \times 10^6 - 2.7489 \times 10^6 = 1.701 \times 10^6 \text{ J/kg} \qquad (162)$$

From (161) and (162) and taking $\xi_{TH} = 0.8$ $$U_1 = (2 \times 1.701 \times 10^6 / 0.8)^{\tfrac{1}{2}} = 2060 \text{ m/s} \qquad (163)$$

Sonic Velocity

From (114) a steam jet at 1273° K. has this sonic velocity:

$$U_{s1} = (1.33 \times 8315 \times 1273/18)^{\tfrac{1}{2}} = 884.4$$

Mach Number of the Steam Jet $$M_1 = U_1/U_{s1} = 2060/884.4 = 2.33$$

According to Figure the angle of the jet cone will be ~45°, which is compatible with Method III.

Mass and Volume Flow of Water $P_e = 10$ kW generator, overall efficiency $\xi = 0.8$, velocity $U = 2000$ m/s $\tfrac{1}{2}\dot{m}U^2 = p_{k1} = 10^4/0.8$ $\dot{m} = 2 \times 10^4/0.8 \times (2 \times 10^3)^2 = 6.25 \times 10^{-3}$ kg/s $q = 6.25 \times 10^{-6}$ m³/s

Pump Power $P_p = P_r q = (70 \times 10^6 - 0.5 \times 10^6) 6.25 \times 10^{-6} = 434.4$ Watts Assuming the pump efficiency is 80%:

$P_p = 435/0.8 = 543$ watts

FRICTION

Prior art cycle studies used the conventional friction flow formula: 15, 21, 23, 12, 25

$$p_f = 4f(L/D)p_k \qquad (164)$$

This formula is derived from incompressible fluid dynamics. Other formulae involving compressible fluid dynamics have been proposed[24]. A comparison of the results of calculations for straight pipes using both formulae show substantially different values.

A reference states:[24]

"Friction pressure drops greater than about 10% make the usual equation for pressure drop of little value, if accuracy is required. The incompressible flow equation (in nomenclature consistent herewith; $R_H$ being the "hydraulic radius":

$$\Delta P = \tfrac{1}{2}f\delta U^2 \Delta L_p/R_H = 4f(\tfrac{1}{2}\delta U^2)(\Delta L_p/P_r) \qquad (164.1)$$

assumes that density δ and velocity U remain constant along the pipe, whereas in an insulated pipe velocity actually increases as pressure and density decrease. The total temperature remains constant, but the static temperature decreases. The combined result of increasing velocity and decreasing static pressure is a rapid increase in Mach number ... "

In another place the same reference states:

"It has been found that turns do not cause as much loss with gases as with liquids, but no very clear quantitative data are available; for the present it is safer to use all values as for liquids."

Hence, the friction flow loss calculations in prior work on ETD cycle analysis are unreliable, and at best represent a "worst case" analysis; and that the friction flow and turning losses may be smaller than calculated therein.

In particular, to our knowledge, there are no data, and no reliable formula, for computing losses in short circulating flows, in a torus or TORON gas flywheel. Therefore, a generalized lumped friction loss coefficient $\zeta_2$ is used. As an example, referring to FIG. 11, in which $\zeta_1 = 0.1$ shows that for an overall efficiency $\xi = 0.80$ (80%), $\zeta_2$ may vary from 0.01 to 1.0, and $\eta$ may vary from 0.42 to 0.88. Hence, for a wide range of variation of the lumped friction loss coefficient $\zeta_2$, a large overall efficiency may be sustained by an appropriate adjustment of $\eta$ and $\zeta_1$.

For the present, particular values of $\zeta_2$ cannot be assigned with any certainty, although an unrealistic upper limit can be calculated for which $\zeta_2 < 0.7$. However, from considerations developed in this Section, it is likely that $\zeta_2 < 0.1$. Experimental data will eventually determine the actual value of $\zeta_2$ under various operating conditions.

Prior art studies on the ETD generator had uncritically accepted a conventional frictional loss formula based on incompressible fluid flow. There exists however another frictional loss formula based on compressible fluid[24.1] flow; which, applied to the same flow conditions through a given length of pipe gives pressure differentials substantially smaller and in agreement with actual measurements. Using this latter formula a new frictional formula is derived herein applied to flows is a short conduit such as a TORON. An analysis of the TORON shape showed an equivalent $L/D=5.5$ compared to an $L/D=11$ for a comparable torus.

These new studies show that the frictional loss in an ETD generator is much smaller than heretofore calculated and may be negligible.

To our knowledge, no formula using compressible fluid flow is available for turning losses. The reported measurements and empirical formulae were made with liquids; it is stated, however, that the turning losses with gases are less than with liquids. In the TORON the diverging-converging cross section is constant including the 360° turn, and this may substantially decrease the turning loss compared to a pipe, particularly for compressible fluid flow with gases rather than losses with liquid flow which is incompressible.

The discussion in a well known work showed that the friction flow formula based on incompressible fluid flow:

$$(\Delta p/p) = 4f(L/D) \tag{164.2}$$

yields substantially greater values of $(\Delta p/p)$ than another, more complicated formula based on compressible fluid flow; which requires the solution of these equations for a round pipe:

$$(\tfrac{1}{2}M_2^2) - \tfrac{1}{2}(\gamma+1)\ln\{[1+\tfrac{1}{2}(\gamma-1)/M_2^2]^{\frac{1}{2}}/M_2\} = (\tfrac{1}{2}M_1^2) - \tfrac{1}{2}(\gamma+1)\ln\{[1+\tfrac{1}{2}(\gamma-1)M_1^2]^{\frac{1}{2}}/M_1\} - [4f(L/D)](\gamma/8) \tag{165}$$

Static pressure ratio $$(p_2/p_1) = M_1[1+\tfrac{1}{2}(\gamma-1)M_1^2]^{\frac{1}{2}}/M_2[1+\tfrac{1}{2}(\gamma-1)M_2^2]^{\frac{1}{2}} \tag{166}$$

Ratio of total to static pressure $$p_o/p = [1+\tfrac{1}{2}(\gamma-1)]^{\gamma/(\gamma-1)} = (T_o/T)^{\gamma/(\gamma-1)} \tag{167}$$

Total pressure ratio $$p_{o2}/p_{o1} = \frac{M_1[1+\tfrac{1}{2}(\gamma-1)M_2^2]^{\frac{1}{2}(\gamma+1)/(\gamma-1)}}{M_2[1+\tfrac{1}{2}(\gamma-1)M_1^2]^{\frac{1}{2}(\gamma+1)/(\gamma-1)}} \tag{168}$$

Define:

$$\psi(M) \equiv \tfrac{1}{2}[(1/M^2) - (\gamma+1)\ln\{[1+\tfrac{1}{2}(\gamma-1)M^2]^{\frac{1}{2}}/M\}] \tag{169}$$

A new solution to equations (165) and (167) has been found for a short pipe:
For small values of $M<<1$ $$p_{o2}/p_{o1} = M_1/M_2 \tag{170}$$

and $$\Delta p/p = \Delta M/M \tag{171}$$

for a small variation in $M_1$ (164A) becomes:

$$\Delta\psi(M) = \psi(M_1) - \psi(M_2) = [4f(L/D)](\gamma/8) \tag{172}$$

in which $[4f(L/D)]$ is the conventional pressure drop for incompressible fluid flow. For small $M<<1$, (172) becomes $$\psi(M) = \tfrac{1}{2}[(1/M^2) - (\gamma+1)\ln(1/M)] \tag{173}$$

Differentiating (173):

$$[\Delta\psi(M)/\Delta M] = -\tfrac{1}{2}[(1/M^3) - (\gamma+1)M] \tag{174}$$

$$= [4f(L/D)/\Delta M \tag{175}$$

where a short length of L is considered to be a differential
From (172) and (173):

$$\Delta M/M = -[4f(L/D)](\gamma/8)/\tfrac{1}{2}[2/M^2) + (\gamma+1)M^2] \tag{176}$$

From (171) and (176)

$$\Delta p/p = \Delta M/M = [4f(L/D)](\gamma/8)\{M^2/[1+\tfrac{1}{2}(\gamma+1)M^4-]\} \tag{177}$$

For a small change in M (168) becomes, using $a' = \tfrac{1}{2}(\gamma-1)$:

$$p_{o1}/p_{o2} = M + \Delta M/M[1 + a'(M+\Delta M)^2/(1+a'M^2)]^{\frac{1}{2}(\gamma+1)/(\gamma-1)} \tag{178}$$

Simplifying (178) using an approximation formula for $M<<1$ $$\Delta p/p = \Delta M/M\{1-[\tfrac{1}{2}(\gamma+1)M^2]/[1+\tfrac{1}{2}(\gamma-1)M^2]\} \tag{179}$$

Substituting for $(\Delta M/M)$ from (176) into (179) and defining the function f(M):

$$f(M) \equiv (\gamma/8)M^2(1-M^2)/[1+\tfrac{1}{2}(\gamma-1)M^2][1+\tfrac{1}{2}(\gamma+1)M^2] \tag{180}$$

Then $$\Delta p/p = [4f(L/D)]f(M) \tag{181}$$

For $M<0.4$; to a good approximation:

$$f(M) \approx (\gamma/8)M^2 \tag{182}$$

and, finally:

$$\Delta p/p \approx [4f(L/D)](\gamma/8)M^2 \tag{183}$$

Comparing (153) with (183) the incompressible vs. compressible formulae, it is important to observe that in the former case $\Delta p/p$ is independent of the Mach No; while in the latter case $\Delta p/p \propto M^2$; which results in a great decrease in calculated friction loss for $M<0.4$.

It is therefore concluded that the conventional incompressible fluid flow formula gave friction power loss estimates which were too large; and, on the contrary, these losses may be almost negligible.

To compare the frictional power loss to the electric power output:

$$p_e/p_k \equiv \eta \tag{184}$$

$$\Delta P_fU/P_kU = p_f/p_k = [4f(L/D)](\gamma/8)M^2 \tag{185}$$

$$p_f/p_e = [4f(L/D)](\gamma/8)M^2/\eta \tag{186}$$

From (186) it follows that at smaller Mach Nos. M, the ratio of frictional power loss to electric power output decreases as $M^2$ and becomes negligible at small values of M.

Equivalent Length/Diameter Ratio of a TORON

Referring to FIGS. 1 and 2:

$$\pi/4D_4^2 = \pi/4D_5^2 - \pi/4D_4^2 \tag{187}$$

$$2D_4^2 = D_5^2 \tag{188}$$

$$D_5/D_4 = 2^{\frac{1}{2}} = 1.41 \tag{189}$$

$$D_3/D_4 = (1-\eta)^{\frac{1}{2}} \tag{190}$$

Path length at $2° - 180°$ turns $= (\pi 2^{\frac{1}{2}}/4)D_4 \tag{191}$

Total path length $= 4D_3 + [\pi 2^{\frac{1}{2}}/4(1-\eta)^{\frac{1}{2}}]D_3 \tag{192}$ $$L/D_3 = 4 + \pi 2^{\frac{1}{2}}/4(1-\eta)^{\frac{1}{2}} = 4 + 1.11/(1-\eta)^{\frac{1}{2}} \tag{193}$$

Ratio of Friction Power Loss to Electric Power in a TORON

From (193), taking as an average: $L/D_3 = 5.5$ and from (186), for a TORON, $\gamma = 1.3$; the ratio of friction power loss to electric power output is:

$$p_f/p_e = 4f(5.5)(1.3/8)M^2/\eta \tag{194}$$

$$= 3.6 f M^2/\eta \tag{195}$$

Since $f \approx 0.02$

For small Mach No. $M < 0.1$, and $\eta = 0.5$
$p_f/p_e \leq 3.6 \times 0.02 \times 0.1/0.5 = 0.0014$, which is negligibly small.

COMPARISON OF METHODS I, II, and III

Single Fluid Method I

Using Method I, a single fluid moving with a large velocity at constant charge density in a straight duct, from (6), a substantial proportion of the kinetic power cannot be efficiently converted to electric power. The ratio of electric power output to fluid kinetic power is too small. A means to increase this by a factor of about 300 is required for breakeven. Methods II and III were devised to provide a solution to this problem.

Mixed Flow Method II (Gas Flywheel ETD Generator)

In Method II an ejector is used, in which a jet mixes with the fill gas and transfers the jet kinetic power to a larger area, whereupon it is converted to electric power on a large area at a small velocity.

The mathematical physics analysis of this Method is based on electrothermodynamics and compressible fluid dynamics. The analysis demonstrates the validity of the gas flywheel concept, showing ranges of the coefficients and parameters and their relationships; and correlates the behavior of the ejector, ETD converter, and the circulation of the fill gas, as the coefficients and parameters are varied. An overall efficiency of the ETD gas flywheel of about 70% (excluding the thermal cycle) is shown to be attainable. This analysis places the gas flywheel ETD generator on a solid theoretical foundation.

For the driver jet velocity required for matching the fill gas velocity, the ETD conversion efficiency $\eta$ must be considered.

FIG. 14 shows that for $\eta = 0.8$ the fill gas velocity $U_3$ at the entrance to the ETD converter is 135 m/s at $\delta_a = 11$; for $\eta = 0.4$ $U_3 = 250$ m/s at $\delta_a = 10$. FIGS. 17 and 18 show that the overall efficiency $\xi$ may be 70% if $\eta = 0.22$ and $\lambda = 0.15$ for $\zeta_2 = 0.07$. The driver jet and fill gas velocities at the entrance to the ejector, $U_1$ and $U_2$, respectively, must be closely matched; for example, $s_{12} = U_1/U_2 = 1.1$.

FIG. 15 shows the sonic velocity $U_{s1}$ vs. stagnation temperature $T_{s1}$ for various gases and vapors. The sonic velocity is substantially decreased because molecular weight $\Omega$ is greatly increased and $\gamma$ is somewhat decreased. Compared with steam, this is particularly the case with the vapors of mercury and the flourocarbons FC-75 and FC-70.

Steam Vapor Jet

Using steam only, which has a molecular weight of 18 and $\gamma = 1.33$, at a stagnation temperature of $900°$ K. the sonic velocity is 743 m/s and the supersonic velocity may exceed 2000 m/s, too great to be matched to that of the entrance velocity $U_3$ of the fill gas and Method III must be used.

Mercury Vapor Jet

Mercury, which has a molecular weight $\Omega_1 = 200.5$ and $\gamma = 1.67$, has the advantage of permitting a large stagnation temperature up to $1600°$ K. At $1150°$ K. the sonic velocity is 282 m/s. A good match is obtained for such a mercury jet issuing into a fill gas at $\delta_a = 10$ and $b_g = 2$; for which $U_3 = 250$ m/s, and $\eta = 0.4$.

Fluorocarbon Vapor Jet

A major improvement in performance is obtained with jets of the fluorocarbon FC-75 and FC-70, which have molecular weights of 416 and 820, respectively, and a $\gamma = 1.03$. These result in 5 to 8 times decrease in sonic velocity compared to steam, and enable the matching of a supersonic jet velocity with the fill gas velocity at a small relative density. At a stagnation temperature of $900°$ K., the sonic velocities of FC-75 and FC-70 are only 136 m/s and 97 m/s respectively; and, at 1.5 Mach, are 204 m/s and 245 m/s. These jets may be approximately matched to the hydrogen/fluorocarbon fill gas $\eta \approx 0.5$ and at $\delta_a \approx 10$.

Electric Power Density $10^6$ W/m$^2$, 100 W/cm$^2$
$10^7$ W/m$^2$, 1 kW/cm$^2$

Fill Gas-Vapor Relative Density $\delta_a$

To achieve an efficient thermal cycle the jet must issue from the greatest pressure to the lowest exit pressure (relative density). For example $\delta_a = 6$ at $400°$ K.

With an efficient ejector and the small lumped loss coefficient $\zeta_2$ the kinetic/electric conversion ratio $\eta$ may be smaller, because then a substantial kinetic power circulates in the gas flywheel. Table 1 enables a selection of $\epsilon$ factors which will provide the greatest gas velocity at the smallest relative gas density for a given output electric power density.

A mixture of fluorocarbon vapor (FC-75 or FC-70) to H$_2$ provides all these advantages[20]. The mixture has a small average molecular weight of about 3.5; and an $m_r = 0.123$ and a large electric breakdown strength of about 2. The consequences of these properties are to meet all the above requirements. This composition may be used with a driver jet of any composition. However, for a fluorocarbon working vapor, there is a temperature limit of stability, in excess of 600° K.

In the supersonic-subsonic coupling with a large molecular weight vapor, as shown in FIG. 20, the mixing may not be complete and some of the jet stream may be slowed by ETD power conversion, without mixing; so that λ may be effectively smaller and the "ejector" thus more efficient.

For an ejector efficiency >0.9 the driverjet velocity $U_1$ must be ~10% greater than the fill gas velocity $U_3$ at the entrance to the ejector, and about 1.5 times the fill gas velocity $U_2$ at the entrance to the converter.

CONCLUSIONS

The analysis and numerical results computed for Method II shows that at an overall efficiency of 70%, the Mach No. of the driver jet is subsonic.

To obtain a total efficiency of about 21%, with an overall efficiency of 70%, a thermal cycle having 30% efficiency is required.

To obtain this efficiency three or more stages are required. This is in accordance with the conclusions of a previous analysis[21].

It is preferred to use steam for the driver jet rather than a fluorocarbon, to avoid possible chemical breakdown at temperatures of 600° K. or more.

A fluorocarbon may be employed mixed with hydrogen at the smaller temperatures used in the ETD converter.

Method III with a supercritical steam cycle will provide a single stage device at a total efficiency of 32%.

In the theoretical treatment of ETD Method II operation, the ejector section between plane 1,2 and 3 and the ETD conversion between planes 3 and 4 are separate. In practice, Method III operation also occurs to an extent controlled by the geometry of the device. The Method III operation is herein shown to be inherently more efficient than Method II operation; since in the former, the ejector is eliminated and there is no ejector loss. Consequently, the operation of the mixed Methods II and III results in a more efficient device.

METHOD IV—MARKS/ERICSSON CYCLES

Liquid Metal-Water-Gas Cycle

In this cycle a liquid metal such as tin is introduced into a circulating gas, such as nitrogen, as charged liquid droplets. The moving gas containing the charged metal droplets provides an ETD conversion of heat/kinetic electric power conversion, in which the heated liquid metal charged droplets act as an internal heat source. Electric power is extracted isothermally from the gas as it expands, and does work against the electric field.

Most of the heat is contained in the liquid metal. There is a pressure drop caused by the electrical power output. The gas is cooled using charged water droplets and electrically compressed in an ETD compression stage, using a small portion of the output electric power. A cycle operating between 1800° K. and 300° K. appears feasible which has an 83% ideal efficiency and an estimated 70% real efficiency. A heat exchanger is provided between the expansion and compression state to exchange heat from high to low temperature, and vice versa.

This cycle resembles an Ericsson cycle using a Marks ETD Generator and Compressor. It is, therefore, termed a Marks/Ericsson ETD Cycle.

Figure 26:
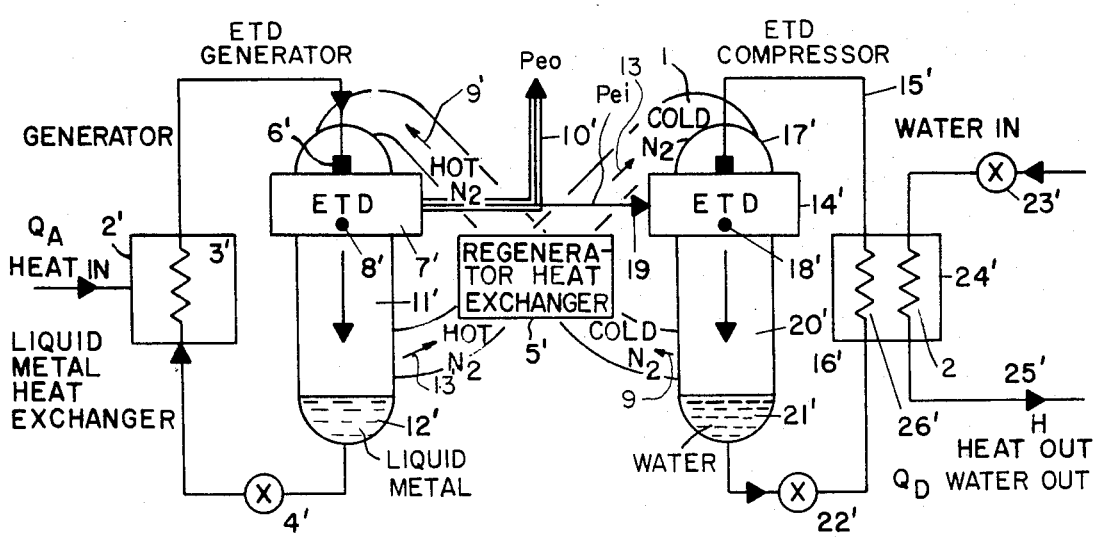
FIG. 26 shows a diagram of the physical components of a Marks-Ericsson ETD Heat/Electric Power Generator using liquid metal, water and nitrogen gas as working materials.

The invention in FIG. 26 shows a diagrammatic sketch of a device operating on a liquid metal/water/gas cycle which converts heat power to electric power.

In FIG. 26, a heat source 1' provides heat power to a heat exchanger 2' in which a liquid metal such as gallium or tin is circulated through the coils 3' and fed by the liquid metal pump 4' under pressure. Liquid metal spray nozzles 6' are contained within the ETD generator section 7'. The heated metal droplets 8' are electrically charged. The heated droplets 8' also act to supply heat to the cool gas 9' entering the charger. The heat supply causes the cold gas to expand and move the gas and entrained charging droplets 8' against the electric field. The power is transferred from the heated gas 9' directly to the electric circuit as $P_e$, the electric power out 10'. The heat/kinetic power of the gas and entrained metal droplets is decreased at the exit of the ETD generator.

The droplets are captured in the liquid pool 12' and returned via the pump 4' back to the heat exchanger 2'. The hot gas 13' exits from the ETD generator and enters the ETD compressor 14'. The ETD compressor is supplied with cold water 15' from the heat exchanger 16'. Cold water enters the ETD compressor via the spray nozzle 17' forming charged droplets 18' in the ETD compressor.

A small proportion of the electric power 10' is supplied to the ETD compressor to the charged droplets 18' thus driving and compressing the incoming gas and simultaneously cooling the hot gas 13' to a smaller temperature, the heat being transferred from the gas to the cold water droplets. At the exit 20' to the ETD converter 14' the discharged droplets are captured in the liquid water pool 21' and returned by the pump 22' through the heat exchanger 16'. The heat exchanger 16' is a liquid-liquid heat exchanger. An external pump 23' pumps cold water through the heat exchanger pipes 24' and out through the pipe 25' where the heated water may be used, for example, for space heating in homes, offices, etc. The heat is transferred from the cool water circulating in tubes 26' to the tubes 24' through the heat exchanger walls. The tubes 26' contain water which is from the ETD compressor 14'.

The theoretical efficiency of the cycle is 83% and the practical efficiency is about 70%.

Steam-Gas Cycle

Referring to FIG. 14, efficient heat/electric power conversion with steam will occur where the velocity $U_2$, downstream of the ejector, falls in a range of 100–500 m/s, depending on the secondary gas density and the breakdown factor $b_g k_a = 1$ to 10, respectively. Greater velocities may be used if $H_2$ or He are used as a secondary gas.

The thermal efficiency of a Rankine cycle utilizing steam with these small temperature changes required to obtain small velocity jets is also small.

Figure 27:
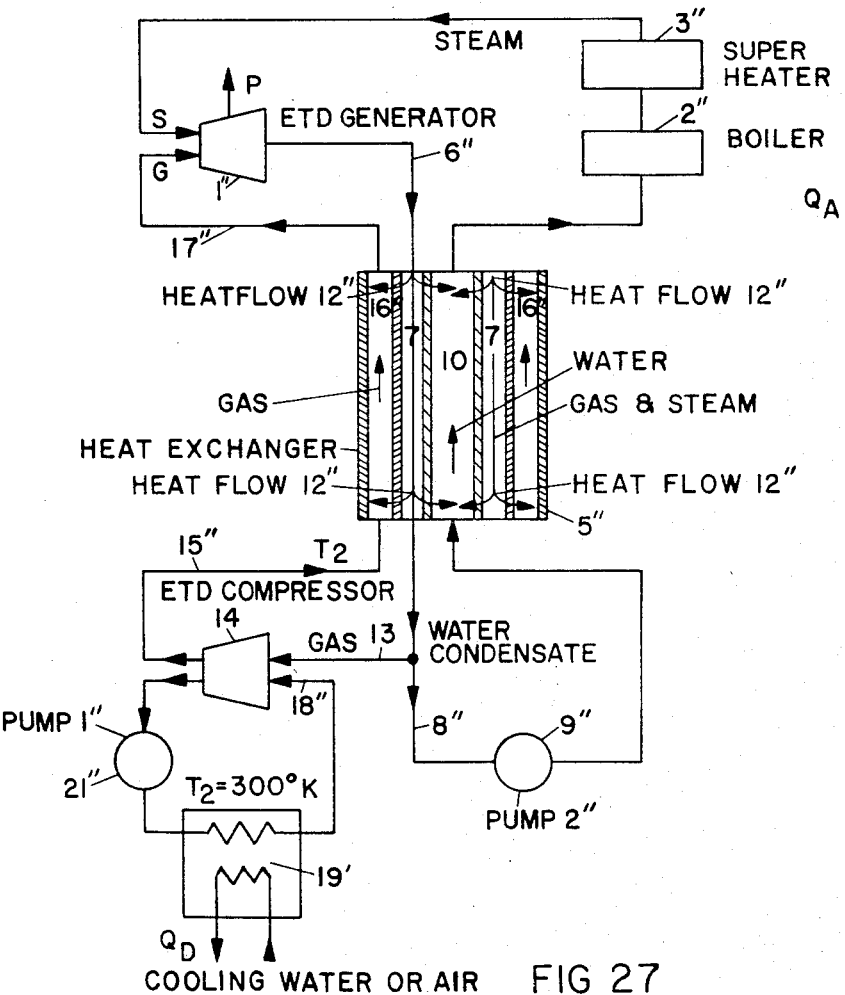
FIG. 27 shows a diagram of a steam/gas Marks-Ericsson cycle.

The device shown in FIG. 27 herewith uses only water, steam, and gas, and has an ideal efficiency of 50%. For example, the upper temperature is 600° K. at 1800 psia. An ETD generator uses an input of steam from a boiler 2" via superheater 3". The electric power output $P_e$ is produced in an ETD converter. The heat exchanger 5" provides heat interchange between the operating high and low temperatures $T_1$ and $T_2$, respectively. The heated gas plus steam 6" passes through a central tube 7" in the heat exchanger 5". The heat exchanger 5" is designed with appropriate cross sectional dimensions such that the velocity of the liquid and gas flow, and hence frictional power losses, are small. As the gas 7" is cooled, the steam component condenses, is collected, separated and passed along to the pipe 8" through a water pump 9" and back through the heat exchanger through the tube 10" where it is heated from temperature $T_2$ to $T_1$ and supplied under pressure to the boiler 2" via the pipe 11". The direction of the heat flow is indicated by the arrows 12", 12"'.

After separation of the condensate 8" from the gas 7", the gas passes along pipe 13" where it enters the compressor 14" which compresses the gas at temperature $T_2$ and passes it via the pipe 15" through the tube 16" of the heat exchanger 5" which heats the gas from the temperature $T_2$ to $T_1$. The compressed and heated gas exits from the tube 16" via pipe 17" and enters the ETD Generator 1". The ETD compressor 14" operates with gas and water at 300° K. The water is charged using the electrojet method The water injected into the compressor 14" via the tube 18" is cooled in the heat exchanger 19" which is the heat sink, cooled with water or air at ambient temperature (300° K.).

After the compression of the gas in the ETD compressor 14" the water is collected and passes via pipe 20" into the heat exchanger 19" where the heat is removed from the system. A second pump 21" provides the circulation of the water through the heat exchanger 19" and back into the compressor via pipe 18".

Figure 28:
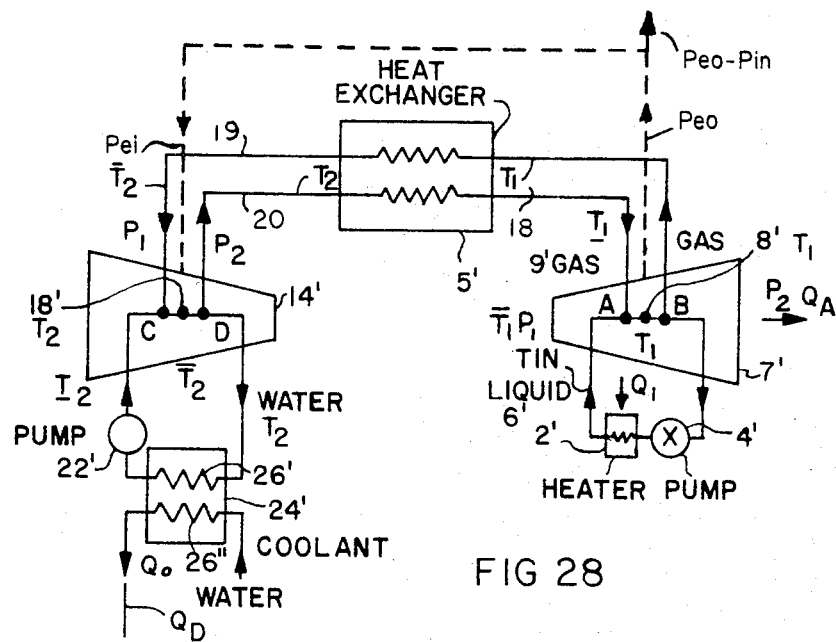
FIG. 28 shows a block diagram of a Marks-Ericsson ETD Heat/Electric Power Generator operating according to Method IV for the device of FIG. 23.

FIG. 28 shows a schematic diagram of the Method IV ETD Generator cycle of the Marks/Ericsson type. The numerical identification for the components in FIG. 28 are generally the same as in FIG. 26.

In FIG. 28 a heater 2' provides heat to a liquid metal such as tin or gallium to increase its temperature $T_1$ to, for example, 2400° K. The liquid metal 6' is introduced into the gas stream at A via the electrojet method, which efficiently produces charged droplets 8' of liquid metal. The charged droplets 8' rapidly impart their heat content to a gas stream, for example, nitrogen, and cause it to expand providing a charged aerosol having a velocity U within the ETD generator 7'. The heat/electric power conversion is nearly isothermal, producing the electric power output $P_{eo}$ between points A and B. The charged liquid metal droplets 8' are discharged and collected and consolidated at B; and the liquid metal is returned via pump 4' to the heater 2'. The gas is then returned to the heat exchanger 5' at $T_1$ where it is cooled to the temperature $T_2$. The cooled gas enters the ETD compressor 14' at C and exits at D. The charged water droplets 18' are introduced by means of an electrojet, supplied with water via the pump 22'. The charged aerosol gas is compressed between C and D electrothermodynamically, using power input $P_{ei}$ which may be taken from a portion of the output power $P_{eo}$. The compressed gas from point D is returned to the heat exchanger 5' where its temperature is increased from $T_2$ to $T_1$ and returned to the ETD generator 7' as previously described. The charged water droplets 18' are discharged at D, the water consolidated, and returned via coils 26'. A water-coolant is supplied via coils 24' to cool the water in the coils 26' before it is drawn into the pump inlet 22'.

Figure 29:
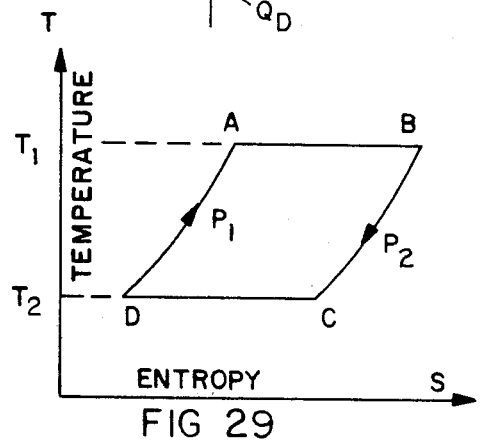
FIG. 29 shows a temperature-entropy cycle diagram for a device according to Method IV.
Figure 30:
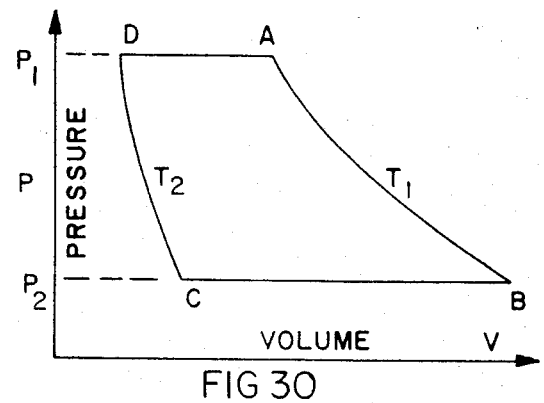
FIG. 30 shows a pressure volume cycle diagram for a device according to Method IV.

Although the real ETD Generator will deviate from the ideal cycle described here, the Ericsson cycle is a convenient starting point. S-T (entropy-temperature) and P-V (pressure-volume) diagrams for the working substance (nitrogen) are shown in FIGS. 29 and 30, respectively. The reference points A, B, C, and D correspond to those in FIG. 28. Subscripted variables refer to specific points in the diagram. For example, $\delta_A$ refers to density at the point A. Between points A and B, we have to a first approximation one dimensional ducted flow obeying the Bernoulli integral:

$$\tfrac{1}{2}\dot{m}U_A^2 + IV_A + RT_2\dot{m}_{N2} \ln \delta_A = \tfrac{1}{2}\dot{m}U_B^2 + IV_B + RT_2 + RT_2\dot{m} \ln \delta_B \quad (196)$$

$$RT_2\dot{m}_{N2} \ln(\delta_B/\delta_A) = \tfrac{1}{2}\dot{m}(U_A^2 - U_B^2) - I(V_B - V_A) \quad (197)$$

where $\dot{m}$ is the mass flow rate ($\dot{m} = \dot{m}_{Sn} + \dot{m}_{N2}$), I the current R the gas constant per unit mass, T the absolute temperature, $\delta$ the density and U the bulk velocity of the stream. The potential is denoted by V, so that $V_B - V_A$ is the potential difference (voltage) between A and B. The details of the heat transfer mechanism between the nitrogen and the tin are discussed hereinafter. Ratio of the mass of the changed tin droplets to the mass of the gas in which they are suspended maintains the substantially constant temperature $T_2$ in the generator. This is accomplished by having the heat content of the charged tin droplets substantially greater than the heat content of the nitrogen gas per unit volume[14]. The logarithmic term appears in equation (196) because the process is isothermal. In fact, the term $RT_2 m \ln(\delta_B/\delta_A)$ is the heat input $Q_{AB}$ to change the state of the gas from A to B; from the ideal gas law for the pressure:

$$p = \delta RT \quad (198)$$

$$Q_{AB} = \int_A^B dQ \quad (199)$$

$$= \dot{m}_{N2} \int_A^B TdS \quad (200)$$

$$= -\dot{m}_{N2} \int_A^B dp/p \quad (201)$$

$$= -\dot{m}_{N2} RT_2 (1/\delta)d\delta \quad (202)$$

$$= \dot{m}_{N2} RT_2 \ln(\delta_A/\delta_B) \quad (203)$$

$$Q_{AB} = \dot{m}_{N2} RT_2 \ln(p_2/p_1) \quad (204)$$

Combining (197) and (204):

$$Q_{AB} = \tfrac{1}{2}\dot{m}(U_A^2 - U_B^2) - I(V_B - V_A) \quad (205)$$

This is also the heat-power that must be supplied to the tin. Ignoring frictional losses and assuming that the electric power $P_e$ comes from thermal energy conversion, we have:

$$P_e = \Delta p U A \quad (206)$$

where the change in pressure is:

$$\Delta p = p_3 - p_4 \quad (207)$$

A = conversion area of the duct

From (204) and (206), heat is supplied at the rate:

$$Q_{AB} = \dot{m}_{N2}RT_2 \ln[1 + (\Delta p/p_3)] \quad (208)$$

From (206) and (208):

$$Q_{AB} = \dot{m}_{N2}RT_2 \ln[1 + (P_e/p_3 UA)] \quad (209)$$

Typically, let $p_3 = 200$ atmospheres:

$$U_3 = 100 \text{ m/s}; \quad A = 0.05 \text{ m}^2; \quad P_e = 10 \text{ kW or 1 W} \tag{210}$$

then $P_e$ is much smaller than $p_3 UA$ and $$\ln[1 + (P_e/p_3 UA)] \text{ is approximately } P_e/p_3 UA \tag{211}$$

Therefore $$Q_{AB} = \dot{m}_{N2} RT_2 P_e/p_3 UA \tag{212}$$

$$= \dot{m}_{N2} RT_2 P_e/\delta_{N2} UA \, RT_2 \tag{213}$$

$$Q_{AB} = P_e \tag{214}$$

Hence, thermal power is converted directly without loss of electric power.

The mass flow rate of tin is related to the parameters of the individual droplets by:

$$m_{Sn} = 4/3\pi R^3 \delta_{Sn} I/N_e \tag{215}$$

An optimum charged aerosol requires $$R/N = 100 \text{ Å per electron charge}$$

Let the tin enter the ETD generator at 2400° K. and be cooled to 1800° K., then the mass flow rate of tin required is:

$$m_{Sn} = Q_{AB}/C_{Sn} \times 600° \text{ K.} = 0.0763(Q_{AB}/10^4 \text{ watts}) \text{kg s}^{-1} \tag{216}$$

$C_{Sn}$ = Specific heat of tin = 218.4 Joules kg$^{-1}$ °K.

Inserting these values into (215), the radius R is:

$$R = 7.2 \times 10^{-9} (Q_{AB}/10^4 \text{ watts})^{\frac{1}{3}} (I/1 \text{ amp})^{-\frac{1}{3}} \text{m} \tag{217}$$

For a current of 1 amp and $Q_{AB} = 10$ kW $$R\nu = 72 \text{ Å} \tag{218}$$

For 1 amp and $Q_{AB} = 1$ MW $$R\nu = 720 \text{ Å} \tag{219}$$

The droplet reaches the equilibrium with the gas stream on the thermal time scale:

$$t_{th} = (R^2 \delta_{N2} C_p / \nu_{N2}) \tag{220}$$

where $C_p$ is the specific heat at constant pressure for the gas, $\nu_{N2}$ is the thermal conductivity of nitrogen (0.1013 W m$^{-1}$ °K.$^{-1}$ at 1800° K.). This is equivalent to:

$$t_{th} = (R^2/\nu_{N2})[\gamma/(\gamma-1)](p/T) \tag{221}$$

$$t_{th} = 2.02 \times 10^{-11} (Q_{AB}/10 \text{ kW})(I/1 \text{ amp})^{-1} \text{ sec} \tag{222}$$

where
$\gamma = 1.4$, the ratio of specific heats at constant pressure ($C_p$) to constant volume ($C_v$).

This demonstrates that the droplet comes into equilibrium almost instantaneously with the nitrogen gas stream.

In the heat exchanger, between points B and C, the heat transfer is:

$$Q_{BC} = \int_B^C dQ \tag{223}$$

$$= \dot{m}_{N2} \int_B^C T dS \tag{224}$$

$$= \dot{m}_{N2} C_p \int_{T_2}^{T_1} dT \tag{225}$$

$$= \dot{m}_{N2} C_p (T_1 - T_2) \tag{226}$$

$$= \dot{m}_{N2} R[\gamma/(\gamma-1)](T_1 - T_2) \tag{227}$$

Depending on the details of the heat transfer mechanism, the bulk velocity at C may or may not be the same as that at B.

Using the same reasoning as above, there is obtained the heat inputs for the remainder of the cycle $$Q_{CD} = \tfrac{1}{2}\dot{m}_{H2O}(U_C^2 - U_D^2) - I V_{CD} \tag{228}$$

$$= RT_1 \dot{m}_{N2} \ln(p_1/p_2) \tag{229}$$

$$Q_{DA} = \dot{m}_{N2} R[\gamma/(\gamma-1)](T_2 - T_1) \tag{230}$$

From these quantities there is obtained the energy W available for work (or conversion into electric energy):

$$W = Q_{AB} + Q_{BC} + Q_{CD} + Q_{DA} \tag{231}$$

$$= R\dot{m}_{N2}(T_2 - T_1)\ln(p_2/p_1) \tag{232}$$

The thermal efficiency of the cycle is defined as:

$$\eta = W/Q_{AB} = 1 - (T_1/T_2) \tag{233}$$

Taking $T_1$ to be room temperature (300° K.) and $T_2$ (1800° K.), the estimated thermal efficiency is $$\eta = 83\% \tag{234}$$

In this approximation, this is also the electric power conversion efficiency.

If the water entering the ETD compressor is heated by 40° K., the mass flow rate of water required is:

$$\dot{m}_{H2O} = (Q_{CD}/C_{H2O} \times 40° \text{ K.}) \tag{235}$$

The specific heat of water is:

$$C_{H2O} \approx 4200 \text{ joules/kg-°K.} \tag{236}$$

$$\dot{m}_{H2O} = Q_{AB}(T_1/T_2)/C_{H2O} \times 40° \text{ K.} \tag{237}$$

$$\dot{m}_{H2O} = 0.1 \, (Q_{AB}/10 \text{ kW}) \text{ kg/s} \tag{238}$$

Because the specific heat of water is nearly twenty times higher than that of tin, despite the relatively small change in water temperature, the mass flow rate of water (0.1 kg/s) is comparable to the mass flow rate of tin (~0.1 kg/s).

"The Case of Ideal Isothermal Operation" and its electrothermodynamic conversion process has previously been discussed[14.1,19.1]. It has been shown that the heat/electric ETD power conversion may be either kinetic or thermal; but for small ratio of $p_e/(p_k + p_{th})$ the form of the conversion equation is that given in Case I equation (1). Hence, Method II or preferably Method III power conversion must be used in the practice of a Marks/Ericsson Method IV System.

Referring to FIGS. 26 and 28-30, inclusive, there follows a more detailed discussion of the temperatures of the gas and liquids at various points of the cycle. The fluid, for example tin, from the first heat exchanger 2' is heated by heat power input $Q_4$ to a temperature $\bar{T}_1$ (for example 2400° K.). This fluid is then formed into charged liquid droplets 8' in the ETD generator 7', the input gas 9' from the heat regenerator 5' is at temperature $T_1$ (for example 1500° K.). The charged aerosol droplets 8' make contact with gas entering the electrothermodynamic generator 7' and increase its kinetic power and temperature to, for example, $T_1 = 1800°$ K. at pressure $P_1$. In this discussion $\bar{T}_1 > T_1 > T_1$, and $\bar{T}_2 > T_2 > T_2$. The heat/electric electrothermodynamic power conversion occurs at constant temperature $T_1$. After power conversion the charged aerosol is discharged, liquid and gas separated at B, the liquid is pumped by pump 4' to the first heat exchanger 2' which is the heat source for the system. At 2' the liquid temperature is again increased to $\bar{T}_1$ to complete generator subcycle. The gas 13' enters the heat exchanger-regenerator 5' at temperature $T_1$ and gives up heat increasing the temperature of the gas travelling in the opposite direction from the compression. The gas 9' exiting from the heat exchanger and entering the electrothermodynamic compressor 20' is at temperature $\bar{T}_2$ and pressure $P_2$. In the compressor 20' coolant water from a coolant heat exchanger 24' forms charged water droplets 18' which absorb heat from the gas by contact and cool it to temperature $T_2$, simultaneously electrothermodynamically compressing it to pressure $P_2$. The gas exiting from the compressor enters the heat exchanger-regeneerator and is heated to temperature $T_1$, thereafter entering the generator to complete the cycle.

DISCUSSION OF METHOD IV

1. In this isothermal process, shock-type solutions are not used in this analysis since the flows are subsonic.

2. In Method III as hereinbefore described the charged aerosol was formed by condensation at the plane $z = a$, resulting in an increase in cross section of about 1000 times, and a cone of decreasing electric charge density is employed to avoid limitations of space charge effects with constant charge density, producing a decrease in the generated voltage, an increase in the electric current and power; and an increase in the electrode spacing. In Method IV, the charged aerosol is formed from small diameter jets of liquid metal which also will form a cone of decreasing charge density with similar characteristics. Gallium may be used instead of tin, because gallium is liquid at 27° C., and is easier to utilize in a piping system. Alternatively, gallium niobium 93/7, which is liquid at 7° C., may be employed. A suitable non-wetting insulator for gallium, such as sapphire, may be employed.

Figure 31:
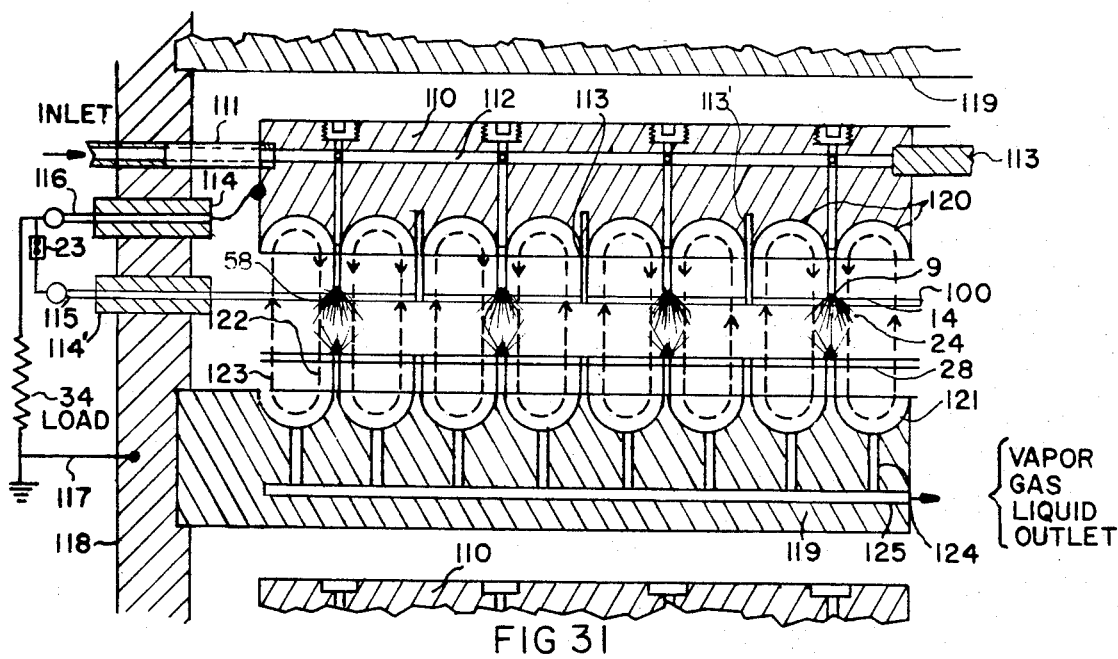
FIG. 31 shows a cross sectional view of an ETD Heat/Electric Power Generator, showing multiple TORON elements with no converging/diverging nozzle walls, forming "convection cells."

FIG. 31 shows a cross section of a multi-element Electrothermodynamic Generator utilizing multiple conical jets similar to those shown in FIGS. 19 and 20.

This structure may be repeated in a given volume to produce a densely packed structure with a high power concentration as shown in FIG. 3 of my U.S. Pat. No. 2,638,555[7]. The improvement herein has to do with the elimination of the walls of the structure by the utilization of "convection cells" for circulating the gas flow internally rather than returning the gas flow externally.

In the Figure, the upper block 110 is fed with steam via the insulating pipe 111 to the distributor pipe 112. The distributor pipe communicates with orifices such as 58 through which protrude the emitter points 14, generally shown in FIGS. 4-7 inclusive. The structure of each of the jets is shown in magnified view in FIG. 19. Collector points 28 are employed to discharge the charged aerosol 24 at the exit plane $z = b$ on each of the jets. The exciter electrodes 100 are supported by stand-off sapphire insulators 113, 113'. Connection is made to the exciter electrodes through the sapphire tube 114 via the exciter lead 115. An exciter potential source 23 is applied between the emitter lead 116 and the ground at 117. The entire device is contained within a grounded stainless steel tank, a portion of the wall of which is shown at 118. The lower block 119 is mounted on the wall 118 in electrical contact therewith.

There is preferably no wall or duct structure surrounding or between the jets. However, the TORON shape is preserved by providing the upper and lower blocks with the surfaces of revolution 120 and 121 respectively, similar to that shown in connection with FIGS. 1 and 2. In the absence of retaining walls the gas circulates as illustrated in a plurality of toroidal configurations, similar to "convection cells" which form in the atmosphere with "up-drafts". By avoiding losses due to the presence of duct surfaces, friction loss is minimized. The inner portion of a convection cell is driven by the conical jet as shown by 122, and the return or outer portion of the "convection cell" is shown at 123. The condensate and gas is collected by the tubes 124, 124' and passed via the header tube 125 to the vapor liquid gas outlet at ground potential. The device shown in FIG. 31 may be utilized in connection with the practice of Methods II, III, or IV.

Operation of the electrojet according to Method III

In FIG. 19, let the orifice emit a conductive fluid (water, liquid, metal) in an electric field, thus causing it to break up into charged droplets in a cone having a half angle $\alpha$ at its apex. By selecting an orifice 10-50 $\mu$m diameter, and adjusting the electric field intensity to 1-10 kv/cm between the charging electrode 99 and the orifice 58 (no point emitter being used in this embodiment) submicron charged aerosol droplets in the range 0.001 to 0.5 $\mu$m are produced which rave a ratio of radius to number of electron charges of 100 Å per electron. A small proportion of electric power output is used to change the charged aerosol droplets from $z = 0$ to $z = a$. Conversion of the heat kinetic power of the charged aerosol gas at decreasing charge density occurs from $z = a$ to $z = b$, as in Method III, in the same manner hereinbefore described.

With the electrojet using Method III, the carrier gas may be subsonic. There is no supersonic jet. The cone of decreasing charge density is obtained directly from the conical distribution of the charged liquid droplets as they disperse within the subsonic carrier gas, and the power conversion increased the $(a/a_o)^2 \Gamma_m$ as before.

As a clarification, Method III may be sub-classified as Method III-A using a supersonic conical jet with the charged aerosol of decreasing charge density formed by condensation of the supercooled vapor onto ions; and as Method III-B using a conductive fluid jet (liquid, metal, water) issuing from a microorifice in an electric field into a moving gas causing its breakup into charged droplets spread within a cone, and forming a charged aerosol of decreasing charge density by mutual repulsion.

For steam, the half apex angle $\theta$ of the supersonic jet varies from 10° at M=1.4 to 50° at M=2.4, and M vs. $\theta$ varies nearly linearly between these angles.

REFERENCES

1.
   Armstrong, W. G., Esq. "On the Efficacy of Steam as a means of producing Electricity, and on a curious Action of a Jet of Steam on a Ball"—Phil Mag. S. 3 Vol. 22, No. 142, January 1843.
   Armstrong, W. G., Esq. "On the Cause of the Electricity of Effluent Steam"—Phil Mag. S. 3rd Series, Vol. xviii, pp 50–57, (1841).
   Armstrong, W. V., Esq. "On the Electrical Phenomena attending the Efflux of Condensed Air, and of Steam generated upon Pressure"—Phil Mag. Vol. xviii, pp 328–337 (1841).
2.
   von Hemlholtz, Robert, "Versushe mit cinem Dampfstrahl", Annalen Der Physik Und Chemie, Neue Folge, Bank XXXII, No. 9, (1887).
   von Helmholtz, Robert and Richarz, Franz, "Ueber die Einwirkung chemischer and electrischer Process auf den Dampfstranh and uber die Dissociation der Gase, Insbesondere des Sauerstoffs", Annalen der Physik Und Chemie, Neue Folge, Bank XL, No. 6 (1890).
3.
   Zeleney, John, "Electrical Discharges from Pointed Conductors", the Physical Review, Vol. XVI, No. 2, pp 102–125.
   Zeleney, John, "Instability of Electrified Liquid Surfaces", The Physical Review, Vol X, No. 1, pp 1–6.
4. Millikan, R, Physical Review 23, 710, (1924).
5. Pauthenier, M. M. and Moreau-Hanot, M., "La Charge Des Particules Spheriques Dans Un Champ Ionise", Journal de Physique No. 12, pp. 590–613 (1932).
6. Vollrath, R. E., "A High Voltage Direct Current Generator", Physical Review, Vol 42, Oct. 15, 1932, pp 198–304.
7. U.S. Pat. No. 2,638,555, issued May 12, 1953 "Heat Electrical Power Conversion Through the Medium of a Charged Aerosol".
   7.1 Column 7, equation (16)
   7.2 Columns 14–17, inclusive, particularly col. 15, lines 53–55.
8. U.S. Pat. No. 3,417,267, issued Dec. 17, 1968 "Heat-Electrical Power Interconversion Devices".
9. Department of the Navy Contracts with Marks Polarized Corporation:
   9.1 Bureau of Naval Weapons, Contract No. 60-0831-c, Final Report, July 1960-December 1961.
   9.2 Bureau of Naval Weapons, Contract NOW 62-0644-c, Final Report, February-August 1962.
   9.3 Bureau of Naval Weapons, contract NOW 63-0225-c, Final Report, September 1962-July 1963.
   9.4 Bureau of Naval Weapons, Contract No. 66-0582-c, Final Report, April 1967-August 1967.
   9.5 Department of the Navy, Contract No. 00019068C-0408, Final Report, Aug. 21, 1969.
10. U.S. Pat. No. 3,191,077, issued June 22, 1965 "Power Conversion Device".
11. U.S. Pat. No. 3,411,025, issued Nov. 12, 1968 "Method and Apparatus for Producing Charged Aerosols".
12. U.S. Pat. No. 3,456,135, issued July 15, 1969 "Gas Flywheel Power Converter".
13. National Bureau of Standards letter dated Mar. 22, 1977, to Mr. Richard K. Sutz, Chief, Office of Energy-Related Inventions Program, Energy Research & Development Administration, Office of Industry Relations, 20 Massachusetts Ave., NW, Washington, DC 20545, from George P. Lewett, National Bureau of Standards, plus Technical Memo No. ATM 77(7602-05)-1, The Aerospace Corporation, El Segundo, CA.
14. U.S. Pat. No. 3,297,887, issued Jan. 10, 1967 "Heat Electrical Power Transducer"
    14.1 Column 14, lines 22–75, Column 15, lines 1–13.
15. Huberman, M. N., et al "Study on Electrofluid Power Generation", Report No. AFAPL-TR-76-31, Final report for period Apr. 23, 1973 to Jan. 23, 1976, prepared by TRW Space & Defense Systems, Redondo Beach, CA 90278.
    15.1 Page 101, equation (28)
    15.2 Page 104, paragraph 3, line 5
    15.3 Page 97, equation (31)
16. U.S. Pat. No. 3,518,461, issued June 30, 1970 "Charged Aerosol Power Conversion Device and Method".
17. U.S. Pat. No. 3,792,293, issued Feb. 12, 1974 "Electrostatic Generator with Charging and Collecting Arrays"
18. U.S. Pat. No. 4,206,396, issued June 3, 1980 "Charged Aerosol Generator with Uni-Electrode Source".
19. Melcher, J., Cheng, T, "Prospects of Electrogas Dynamic Power Generation", Conference Paper, Massachusetts Institute of Technology, Cambridge, MA.
    19.1 Page 3, columns 1,2
20. "Fluorinert Electronic Liquids"—Technical Information 1978 Edition, 3M Corporation.
21. Dowdell, et al "The Case for Electrohydrodynamic (EHD) Energy Conversion"
22. "Steam Tables—Thermodynamic Properties of Water Including Vapor, Liquid, and Solid Phases (SI Units)", Keenan, et al, John Wiley & Sons, New York, 1978
23. Urquidi, Beatriz "Cycle Study of a Mercury-Colloidal Electrofluid Dynamic Power Generator", Report ARL-TR 74-0127, October 1974.
24. "Kent's Mechanical Engineers' Handbook"—Power Volume, John Wiley & Sons, New York, 12th Edition, March 1950. 24.1 Page 6-44 to 6-47.
25. "The Charged Aerosol Generator", presented at the Interagency Advanced Power Group Symposium on Electrostatic Energy Conversion, Apr. 23, 1963, Philadelphia, PA.
26. "Optimum Charged Aerosols for Power Conversion", J. Appl. Phys., Vol. 43, No. 1, January 1972, pp 219–230.
27. U.S. Government contracts performed on the ETD Heat/Electric Power Generator
    Energy Research and Development Administration; Contract EU-78-G-01 6255; 2/1/78–8/31/78.
    Department of Energy; Contract ER-78-C-02-4985; 9/1/78–8/31/79

Department of Energy; Contract DEAC02-78ER04985.A001; 9/1/79 to 2/29/80.

Having thus fully described the invention, what I wish to claim is:

1. In an Electrothermodynamic heat/electric power converter, a converter body, a carrier gas-vapor having a subsonic velocity under pressure in said converter body, a source of superheated vapor, a micro orifice nozzle, the throat of said micro orifice nozzle having a diameter $D_o$, said superheated vapor being supplied to said micro orifice nozzle, a jet of supercooled vapor issuing from said micro orifice nozzle, an ion source comprising an emitter point, a charging electrode in proximity to said emitter point, a collector point electrode, an electrical load connected between said emitter and said collector, said jet issuing from said nozzle at a supersonic velocity, thereby forming an expanding jet having a conical boundary between said expanding jet and said gas-vapor, the apex of said conical boundary being a distance $a_o$ to the said throat diameter $D_o$ of said micro orifice nozzle, said boundary making a half apex angle $\theta$ to the axis of said jet, said angle $\theta$ being between 10° to 50° as a function of the Mach Number of the jet $1.4<M<2.4$ ions from said ion source being emitted within an ion cone into the supercooled vapor of said jet, said ion cone having a half apex angle $\alpha$, a charged aerosol formed by condensation of the said supercooled vapor in said jet onto said ions at the entrance plane $z=a$, the kinetic power density of the said supersonic jet being thereby decreased from $z=a_o$ to $z=a$ by a factor of $10^4>(a/a_o)^2>10^2$, said charged aerosol being established within said conical boundary layer between said entrance plane at $z-a$ and an exit plant at $z=b$, said distances a and b being measured from said apex, ions of a sign opposite to that of said charged aerosol, said charged aerosols being discharged at the plane $z-b$ by said ions of opposite sign emitted from said collector point, said charged aerosol having a charged density which decreases according to $(z/a)^m$ from $z=a$ to $z=b$, where m is a negative exponential number $-2<m<0$, the power conversion in said cone between $z=a$ and $z=b$ being increased by the factor $40>\Gamma>1$; whereby a substantial proportion of the heat kinetic power of said supersonic jet is directly converted to electrical power within said jet, at increased current, decreased voltage and increased conversion space length $L=b-a$, compared to constant charge density conversion, for which $m=0$.

2. An Electrothermodynamic power converter according to claim 1, in which the velocity of said charged aerosol decreases inversely as $(z/a)^{(m-2)}$ between $z=a$ and $z=b$, as the kinetic power is converted to electrical power, and as the area of the cone increases according to $(z/a)^2$.

3. In an Electrothermodynamic power converter according to claim 1, said conical supersonic jet being surrounded by said carrier gas-vapor comprising hydrogen and an additive vapor to increase the electrical breakdown strength.

4. An Electrothermodynamic power converter according to claim 1, wherein said jet is a supersonic steam jet, and said charged aerosol is formed by condensation onto said ions.

5. An Electrothermodynamic power converter according to claim 1, in which said heat/electric electrothermodynamic converter is in a supercritical Rankine cycle, said superheated vapor being supercritical.

6. In an Electrothermodynamic power converter according to claim 1, a plurality of said micro orifice nozzles forming parallel jets in an array.

7. In an Electrothermodynamic power converter according to claim 1, said subsonic carrier gas surrounding said conical jet travelling parallel to said jet at the boundary layer, but having a return flow in the opposite direction forming a toroidal convection cell in the configuration of a TORON without walls.

8. In an Electrothermodynamic power converter according to claim 1, a plurality of said jets and said convection cells which are in parallel.

* * * * *